US010875665B2

(12) United States Patent
Peng et al.

(10) Patent No.: US 10,875,665 B2
(45) Date of Patent: Dec. 29, 2020

(54) AERIAL VEHICLE CHARGING METHOD AND DEVICE

(71) Applicant: CAINIAO SMART LOGISTICS HOLDING LIMITED, Grand Cayman (KY)

(72) Inventors: Anzhai Peng, Hangzhou (CN); Yong Wang, Hangzhou (CN)

(73) Assignee: Cainiao Smart Logistics Holding Limited, Grand Cayman (KY)

( * ) Notice: Subject to any disclaimer, the term of this patent is extended or adjusted under 35 U.S.C. 154(b) by 235 days.

(21) Appl. No.: 16/055,744

(22) Filed: Aug. 6, 2018

(65) Prior Publication Data
US 2019/0039750 A1 Feb. 7, 2019

(30) Foreign Application Priority Data
Aug. 7, 2017 (CN) .......................... 2017 1 0667501

(51) Int. Cl.
*B64D 27/24* (2006.01)
*B64F 1/00* (2006.01)
(Continued)

(52) U.S. Cl.
CPC ............ *B64F 1/007* (2013.01); *B64C 39/024* (2013.01); *B64D 27/24* (2013.01); *B64D 37/005* (2013.01);
(Continued)

(58) Field of Classification Search
CPC ........ B64F 1/007; B64F 1/364; B64C 39/024; B64C 2201/066; B64C 2201/042; B64C 2201/18; B64D 47/02
See application file for complete search history.

(56) References Cited

U.S. PATENT DOCUMENTS 3,917,196 A * 11/1975 Pond ...................... B64D 39/00
342/23
4,834,531 A * 5/1989 Ward ..................... B64G 1/646
244/172.4
(Continued)

FOREIGN PATENT DOCUMENTS

CN 204642164 U 9/2015
CN 105226836 A 1/2016
(Continued)

OTHER PUBLICATIONS

PCT International Search Report and the Written Opinion dated Oct. 16, 2018, issued in corresponding International Application No. PCT/US2018/045369 (8 pages).
(Continued)

*Primary Examiner* — Brian M O'Hara
*Assistant Examiner* — Keith L Dixon
(74) *Attorney, Agent, or Firm* — Sheppard Mullin Richter & Hampton LLP

(57) ABSTRACT

A method for charging an aerial vehicle is implementable by an aerial vehicle and may comprise: obtaining a relative location of the aerial vehicle to a landing deck, and landing to the landing deck according to the relative location; sending an instruction signal to a charging apparatus located on the landing deck, to cause the charging apparatus to detect a movement route from the charging apparatus to the aerial vehicle; and docking to the charging apparatus via a charging end of the aerial vehicle.

20 Claims, 10 Drawing Sheets

(51) Int. Cl.
    *B64C 39/02*           (2006.01)
    *B64D 47/02*           (2006.01)
    *B64F 1/36*            (2017.01)
    *B64D 37/00*           (2006.01)

(52) U.S. Cl.
    CPC ............... *B64D 47/02* (2013.01); *B64F 1/36* (2013.01); *B64C 2201/066* (2013.01)

(56) References Cited

U.S. PATENT DOCUMENTS

| | | | | |
|---|---|---|---|---|
| 5,000,398 | A * | 3/1991 | Rashev | B64C 27/08 244/110 E |
| 5,109,345 | A * | 4/1992 | Dabney | B64G 1/646 701/3 |
| 5,530,650 | A * | 6/1996 | Biferno | B64D 39/00 244/135 A |
| 6,254,035 | B1 * | 7/2001 | Howard | B64G 1/24 244/172.4 |
| 6,910,660 | B2 * | 6/2005 | LeCroy, Jr. | B64G 1/646 244/158.1 |
| 8,132,759 | B2 * | 3/2012 | Von Thal | B64D 39/00 244/135 A |
| 9,056,676 | B1 | 6/2015 | Wang | |
| 10,498,248 | B2 | 12/2019 | Leadingham | |
| 2004/0129865 | A1 * | 7/2004 | Doane | G02B 5/124 250/216 |
| 2006/0060709 | A1 * | 3/2006 | Thal | B64D 39/00 244/135 A |
| 2012/0059536 | A1 * | 3/2012 | Pepicelli | B64D 39/00 701/11 |
| 2013/0068889 | A1 * | 3/2013 | Richardson | B64D 39/04 244/135 A |
| 2015/0041598 | A1 * | 2/2015 | Nugent | B64C 39/024 244/53 R |
| 2016/0009413 | A1 | 1/2016 | Lee et al. | |
| 2016/0039540 | A1 | 2/2016 | Wang | |
| 2016/0039542 | A1 | 2/2016 | Wang | |
| 2016/0159496 | A1 | 6/2016 | O'Toole | |
| 2016/0250933 | A1 | 9/2016 | Kim et al. | |
| 2016/0332748 | A1 | 11/2016 | Wang | |
| 2016/0368464 | A1 | 12/2016 | Hassounah | |
| 2017/0116867 | A1 * | 4/2017 | Cherepinsky | B64C 25/34 |
| 2017/0129603 | A1 | 5/2017 | Raptopoulos et al. | |
| 2017/0158353 | A1 | 6/2017 | Schmick | |
| 2017/0344000 | A1 | 11/2017 | Krishnamoorthy et al. | |

FOREIGN PATENT DOCUMENTS

| | | |
|---|---|---|
| CN | 205004789 U | 1/2016 |
| CN | 105517664 A | 4/2016 |
| CN | 205178593 U | 4/2016 |
| CN | 205846780 U | 12/2016 |
| CN | 106628220 A | 5/2017 |
| CN | 206485585 U | 9/2017 |
| CN | 108974355 A | 12/2018 |
| JP | 2015-517296 A | 6/2015 |
| JP | 2017-071285 A | 4/2017 |
| KR | 10-2016-0104385 A | 9/2016 |
| WO | 2016/053746 A1 | 4/2016 |
| WO | 2017/109780 A1 | 6/2017 |
| WO | 2017/206705 A1 | 12/2017 |

OTHER PUBLICATIONS

Notice of Reasons for Rejection dated Sep. 8, 2020, issued in related Japanese Application No. 2020-506741, with English machine translation (6 pages).

* cited by examiner

AERIAL VEHICLE CHARGING METHOD AND DEVICE

CROSS REFERENCE TO RELATED APPLICATION

The present application is based on and claims priority to Chinese Patent Application No. 201710667501.9, filed on Aug. 7, 2017, which is incorporated herein by reference in its entirety.

TECHNICAL FIELD

This application relates to the field of Internet technologies, and in particular, to an aerial vehicle charging method and a related device.

BACKGROUND

Aerial vehicles include unmanned aerial vehicles known as drone, which refer to flying devices that uses technologies such as wireless remote control and automatic control to achieve the autonomous driving function, and include a plurality of types such as unmanned helicopters, unmanned fixed-wing aerial vehicles, unmanned multi-rotor aerial vehicles, unmanned airships, and unmanned parasol aerial vehicles. The unmanned aerial vehicles are widely applied to a plurality of fields such as aerial photography, environmental monitoring, and public security monitoring for the advantages such as having no risk of casualty.

Currently, most aerial vehicles need to be driven by electric power. However, the duration of flight of an aerial vehicle is relatively short, and the aerial vehicle usually needs to be charged. Moreover, during charging, the aerial vehicle needs to be operated and maintained by an operator, leading to a relatively low charging efficiency as well as additional human labor costs.

To resolve the foregoing problems, a power supply end is usually disposed on a landing pad. An aerial vehicle implements accurate docking to the power supply end in a process of landing to the landing pad, to implement charging to the aerial vehicle. However, because of effects of environmental factors and the like, it is difficult for the aerial vehicle to achieve the required precision in the landing process. During charging, manual intervention is usually needed, and automatic charging cannot be achieved.

SUMMARY

The technical problem to be solved in this disclosure is to provide a method for charging an aerial vehicle and a related apparatus, so that the required precision in a landing process of an aerial vehicle can be alleviated when the aerial vehicle needs to be charged, thereby implementing automatic charging to the aerial vehicle.

The embodiments of this disclosure disclose the following technical solutions:

An embodiment of this disclosure provides a method for charging an aerial vehicle, where the method is applied to an aerial vehicle, the aerial vehicle is provided with a charging end, and the method includes: obtaining a relative location to a landing deck, and landing to the landing deck according to the relative location; sending an instruction signal to a charging apparatus located on the landing deck, where the instruction signal is used to instruct the charging apparatus to detect a movement route from the charging apparatus to the aerial vehicle; and completing charger docking with the charging apparatus by using the charging end.

Optionally, before the completing charger docking with the charging apparatus by using the charging end, the method further includes: waiting for the charging apparatus to move towards the aerial vehicle according to the movement route.

Optionally, the aerial vehicle is further provided with an optical signal transmitter, and the sending an instruction signal to a charging apparatus located on the landing deck includes: transmitting an optical signal by using the optical signal transmitter.

Optionally, the optical signal is used to instruct the charging apparatus to detect a coverage area of the optical signal according to a received location of the optical signal, and the waiting for the charging apparatus to move towards the aerial vehicle according to the movement route includes: waiting for the charging apparatus to move towards the aerial vehicle according to the movement route determined by the coverage region.

Optionally, the transmitting an optical signal by using the optical signal transmitter includes: transmitting at least two beams of optical signals by using the optical signal transmitter, where wavelengths of the at least two beams of optical signals are different, and the at least two beams of optical signals are used to instruct the charging apparatus to detect an overlapping region of the at least two beams of optical signals according to received locations of the at least two beams of optical signals, and the waiting for the charging apparatus to move towards the aerial vehicle according to the movement route determined by the coverage region includes: waiting for the charging apparatus to move towards the aerial vehicle according to the movement route determined by the overlapping region.

Optionally, the optical signal is used to instruct the charging apparatus to detect a location and a direction of the aerial vehicle according to a received location of the optical signal, and the waiting for the charging apparatus to move towards the aerial vehicle according to the movement route includes: waiting for the charging apparatus to move towards the aerial vehicle according to the movement route determined by the location and the direction of the aerial vehicle.

Optionally, the aerial vehicle is further provided with a communication module, and the sending an instruction signal to a charging apparatus located on the landing deck includes: sending a communication signal to the charging apparatus by using the communication module.

Optionally, the communication signal is used to instruct the charging apparatus to detect a location and a direction of the aerial vehicle, and the waiting for the charging apparatus to move towards the aerial vehicle according to the movement route includes: waiting for the charging apparatus to move towards the aerial vehicle according to the movement route determined by the location and the direction of the aerial vehicle.

Optionally, the aerial vehicle is further provided with an aerial vehicle positioning mark, and the communication signal is used to instruct the charging apparatus to detect the location and the direction of the aerial vehicle according to the aerial vehicle positioning mark.

Optionally, the completing charger docking with the charging apparatus by using the charging end includes: when the charging apparatus is close to the aerial vehicle, causing, by using magnetic attraction, the charging end to complete the charger docking with the charging apparatus.

Optionally, the charging end of the aerial vehicle and a power supply end of the charging apparatus are provided with a magnetic contact pair, and the magnetic contact pair is used to generate the magnetic attraction when the charging apparatus is close to the aerial vehicle.

An embodiment of this disclosure provides a method for charging an aerial vehicle, where the method is applied to a charging apparatus, the charging apparatus is located on a landing deck, and the method includes: receiving an instruction signal sent by the aerial vehicle after the aerial vehicle lands to the landing deck; detecting a movement route from the charging apparatus to the aerial vehicle according to the instruction signal; moving towards the aerial vehicle according to the movement route; and completing charger docking with a charging end disposed on the aerial vehicle.

Optionally, the receiving an instruction signal sent by the aerial vehicle after the aerial vehicle lands to the landing deck includes: receiving an optical signal sent by the aerial vehicle by using an optical signal transmitter after the aerial vehicle lands to the landing deck.

Optionally, the detecting a movement route from the charging apparatus to the aerial vehicle according to the instruction signal includes: detecting a coverage region of the optical signal according to a received location of the optical signal, and the moving towards the aerial vehicle according to the movement route includes: moving towards the aerial vehicle according to the coverage region.

Optionally, the moving towards the aerial vehicle according to the coverage region includes: detecting a location and a direction of the aerial vehicle after entering the coverage region; and moving towards the aerial vehicle according to the location and the direction of the aerial vehicle.

Optionally, the receiving an optical signal sent by the aerial vehicle by using an optical signal transmitter after the aerial vehicle lands to the landing deck includes: receiving at least two beams of optical signals transmitted by the aerial vehicle by using the optical signal transmitter after the aerial vehicle lands to the landing deck, where wavelengths of the at least two beams of optical signals are different; the detecting a coverage region of the optical signal according to a received location of the optical signal includes: detecting an overlapping region of the at least two beams of optical signals according to received locations of the at least two beams of optical signals; and the moving towards the aerial vehicle according to the coverage region includes: moving towards the aerial vehicle according to the overlapping region.

Optionally, the charging apparatus is provided with an optical signal receiver, and the moving towards the aerial vehicle according to the overlapping region includes: entering the overlapping region and moving; in response to detecting, by using the optical signal receiver, that the charging apparatus has reached an edge of the overlapping region, moving along a zigzag between edges of the overlapping region; and in response to detecting, by using the optical signal receiver, that the charging apparatus has reached a top corner of the overlapping region, moving from the top corner of the overlapping region towards the aerial vehicle.

Optionally, the detecting a movement route from the charging apparatus to the aerial vehicle according to the instruction signal includes: detecting a location and a direction of the aerial vehicle according to a received location of the optical signal; and determining the movement route from the charging apparatus to the aerial vehicle according to the location and the direction of the aerial vehicle.

Optionally, the receiving an optical signal sent by the aerial vehicle by using an optical signal transmitter after the aerial vehicle lands to the landing deck includes: receiving, by using a detection apparatus disposed on the landing deck, the optical signal transmitted by the aerial vehicle by using the optical signal transmitter after the aerial vehicle lands to the landing deck.

Optionally, the landing deck includes a landing pad, and the detection apparatus is a movable detection apparatus, and is disposed on an edge of the landing pad.

Optionally, the receiving an instruction signal sent by the aerial vehicle after the aerial vehicle lands to the landing deck includes: receiving a communication signal sent by the aerial vehicle by using a communication module after the aerial vehicle lands to the landing deck.

Optionally, the detecting a movement route from the charging apparatus to the aerial vehicle according to the instruction signal includes: detecting a location and a direction of the aerial vehicle after the communication signal is received; and determining the movement route from the charging apparatus to the aerial vehicle according to the location and the direction of the aerial vehicle.

Optionally, the detecting a location and a direction of the aerial vehicle includes: detecting the location and the direction of the aerial vehicle according to an aerial vehicle positioning mark disposed on the aerial vehicle.

Optionally, the completing charger docking with a charging end disposed on the aerial vehicle includes: when the charging apparatus is close to the aerial vehicle, causing, by using magnetic attraction, the charging apparatus to complete the charger docking with the charging end disposed on the aerial vehicle.

Optionally, a power supply end of the charging apparatus and the charging end of the aerial vehicle are provided with a magnetic contact pair, and the magnetic contact pair is used to generate the magnetic attraction when the charging apparatus is close to the aerial vehicle.

Optionally, the charging apparatus includes a charging vehicle.

An embodiment of this disclosure provides a signal receiving method, where the method is applied to a landing pad, the landing pad is provided with a detection apparatus and a controller, and the method includes: receiving, by using the detection apparatus, an optical signal transmitted by an aerial vehicle located on the landing pad by using an optical signal transmitter; and determining, by the controller, a received location of the optical signal, and sending the received location to a charging apparatus located on the landing pad.

Optionally, the detection apparatus is a movable detection apparatus, and is disposed on an edge of the landing pad.

Optionally, the landing pad is provided with a plurality of landing regions, and the landing regions are respectively used for landing different aerial vehicles.

An embodiment of this disclosure provides a method for charging an aerial vehicle, where the method is applied to an aerial vehicle, the aerial vehicle is provided with a charging end, and the method includes: obtaining a relative location to a landing deck, and landing to the landing deck according to the relative location; detecting a movement route from the aerial vehicle to a charging apparatus located on the landing deck; moving towards the charging apparatus according to the movement route; and completing charger docking with the charging apparatus by using the charging end.

Optionally, the detecting a movement route from the aerial vehicle to a charging apparatus located on the landing deck includes: detecting a location and a direction of the charging apparatus; and determining the movement route from the aerial vehicle to the charging apparatus according to the location and the direction of the charging apparatus.

Optionally, the detecting a movement route from the aerial vehicle to a charging apparatus located on the landing deck includes: detecting a location coordinate and a direction of the aerial vehicle; obtaining a location coordinate and a direction of the charging apparatus; and determining the movement route from the aerial vehicle to the charging apparatus according to the location coordinate and the direction of the aerial vehicle and the location coordinate and the direction of the charging apparatus.

Optionally, the aerial vehicle is further provided with an optical signal transmitter, and the method further includes: transmitting an optical signal by using the optical signal transmitter, and the detecting a location coordinate and a direction of the aerial vehicle includes: detecting the location coordinate and the direction of the aerial vehicle according to a received location of the optical signal.

Optionally, the completing charger docking with the charging apparatus by using the charging end includes: when the aerial vehicle is close to the charging apparatus, causing, by using magnetic attraction, the charging end to complete the charger docking with the charging apparatus.

An embodiment of this disclosure provides a method for charging an aerial vehicle, where the method is applied to a charging apparatus, the charging apparatus is located on a landing deck, and the method includes: after the aerial vehicle lands to the landing deck, waiting for the aerial vehicle to move towards the charging apparatus according to a movement route to the charging apparatus; and completing charger docking with a charging end disposed on the aerial vehicle.

Optionally, the completing charger docking with a charging end disposed on the aerial vehicle includes: when the aerial vehicle is close to the charging apparatus, causing, by using magnetic attraction, the charging apparatus to complete the charger docking with the charging end disposed on the aerial vehicle.

An embodiment of this disclosure provides a signal receiving method, where the method is applied to a landing pad, the landing pad is provided with a detection apparatus and a controller, and the method includes: receiving, by using the detection apparatus, an optical signal transmitted by an aerial vehicle located on the landing pad by using an optical signal transmitter; and determining, by the controller, a received location of the optical signal, and sending the received location to the aerial vehicle.

Optionally, the detection apparatus is a movable detection apparatus, and is disposed on an edge of the landing pad.

Optionally, the landing pad is provided with a plurality of landing regions, and the landing regions are respectively used for landing different aerial vehicles.

An embodiment of this disclosure provides an aerial vehicle, including: a controller, a sender, and a charging end, where the controller is configured to obtain a relative location to a landing deck, and control, according to the relative location, the aerial vehicle to land to the landing deck; the sender is configured to send an instruction signal to a charging apparatus located on the landing deck, where the instruction signal is used to instruct the charging apparatus to detect a movement route from the charging apparatus to the aerial vehicle; and the charging end is configured to complete charger docking with the charging apparatus.

Optionally, the controller is further configured to wait for the charging apparatus to move towards the aerial vehicle according to the movement route before the charging end completes the charger docking with the charging apparatus.

Optionally, the sender includes an optical signal transmitter, and the optical signal transmitter is configured to transmit an optical signal.

Optionally, the optical signal is used to instruct the charging apparatus to detect a coverage area of the optical signal according to a received location of the optical signal, and when waiting for the charging apparatus to move towards the aerial vehicle according to the movement route, the controller is configured to wait for the charging apparatus to move towards the aerial vehicle according to the movement route determined by the coverage region.

Optionally, the optical signal transmitter is configured to transmit at least two beams of optical signals, where wavelengths of the at least two beams of optical signals are different, and the at least two beams of optical signals are used to instruct the charging apparatus to detect an overlapping region of the at least two beams of optical signals according to received locations of the at least two beams of optical signals, and when waiting for the charging apparatus to move towards the aerial vehicle according to the movement route determined by the coverage region, the controller is configured to wait for the charging apparatus to move towards the aerial vehicle according to the movement route determined by the overlapping region.

Optionally, the optical signal is used to instruct the charging apparatus to detect a location and a direction of the aerial vehicle according to a received location of the optical signal, and when waiting for the charging apparatus to move towards the aerial vehicle according to the movement route, the controller is configured to wait for the charging apparatus to move towards the aerial vehicle according to the movement route determined by the location and the direction of the aerial vehicle.

Optionally, the sender includes: a communication module, and the communication module is configured to send a communication signal to the charging apparatus.

Optionally, the communication signal is used to instruct the charging apparatus to detect a location and a direction of the aerial vehicle, and when waiting for the charging apparatus to move towards the aerial vehicle according to the movement route, the communication module is configured to wait for the charging apparatus to move towards the aerial vehicle according to the movement route determined by the location and the direction of the aerial vehicle.

Optionally, the aerial vehicle is further provided with an aerial vehicle positioning mark, and the communication signal is used to instruct the charging apparatus to detect the location and the direction of the aerial vehicle according to the aerial vehicle positioning mark.

Optionally, the charging end is configured to cause, by using magnetic attraction, the charging end to complete the charger docking with the charging apparatus when the charging apparatus is close to the aerial vehicle.

Optionally, the charging end of the aerial vehicle and a power supply end of the charging apparatus are provided with a magnetic contact pair, and the magnetic contact pair is used to generate the magnetic attraction when the charging apparatus is close to the aerial vehicle.

An embodiment of this disclosure provides a charging apparatus, where the charging apparatus is located on a landing deck, and includes: a receiver, a detector, a controller, and a power supply end; the receiver is configured to receive an instruction signal sent by an aerial vehicle after the aerial vehicle lands to the landing deck; the detector is configured to detect a movement route from the charging apparatus to the aerial vehicle according to the instruction signal; the controller is configured to control the charging apparatus to move towards the aerial vehicle according to the movement route; and the power supply end is configured to complete charger docking with a charging end disposed on the aerial vehicle.

Optionally, the receiver is configured to receive an optical signal sent by the aerial vehicle by using an optical signal transmitter after the aerial vehicle lands to the landing deck.

Optionally, the detector is configured to detect a coverage region of the optical signal according to a received location of the optical signal, and the controller is configured to control the charging apparatus to move towards the aerial vehicle according to the coverage region.

Optionally, when the charging apparatus moves towards the aerial vehicle according to the coverage region, the controller is configured to detect a location and a direction of the aerial vehicle after the control apparatus enters the coverage region, and control the charging apparatus to move towards the aerial vehicle according to the location and the direction of the aerial vehicle.

Optionally, when receiving the optical signal sent by the aerial vehicle by using the optical signal transmitter after the aerial vehicle lands to the landing deck, the receiver is configured to receive at least two beams of optical signals transmitted by the aerial vehicle by using the optical signal transmitter after the aerial vehicle lands to the landing deck, where wavelengths of the at least two beams of optical signals are different; when detecting the coverage region of the optical signal according to the received location of the optical signal, the detector is configured to detect an overlapping region of the at least two beams of optical signals according to received locations of the at least two beams of optical signals; and when controlling the charging apparatus to move towards the aerial vehicle according to the coverage region, the controller is configured to control the charging apparatus to move towards the aerial vehicle according to the overlapping region.

Optionally, the receiver includes an optical signal receiver, and when controlling the charging apparatus to move towards the aerial vehicle according to the overlapping region, the controller is configured to control the charging apparatus to enter the overlapping region, in response to detecting by using the optical signal receiver that the charging apparatus has reached an edge of the overlapping region, control the charging apparatus to move along a zigzag between edges of the overlapping region, and in response to detecting by using the optical signal receiver that the charging apparatus has reached a top corner of the overlapping region, control the charging apparatus to move from the top corner of the overlapping region towards the aerial vehicle.

Optionally, when detecting the movement route from the charging apparatus to the aerial vehicle according to the instruction signal, the detector is configured to detect a location and a direction of the aerial vehicle according to a received location of the optical signal, and determine the movement route from the charging apparatus to the aerial vehicle according to the location and the direction of the aerial vehicle.

Optionally, when receiving the optical signal sent by the aerial vehicle by using the optical signal transmitter after the aerial vehicle lands to the landing deck, the receiver is configured to receive, by using a detection apparatus disposed on the landing deck, the optical signal transmitted by the aerial vehicle by using the optical signal transmitter after the aerial vehicle lands to the landing deck.

Optionally, the landing deck includes a landing pad, and the detection apparatus is a movable detection apparatus, and is disposed on an edge of the landing pad.

Optionally, the receiver is configured to receive a communication signal sent by the aerial vehicle by using a communication module after the aerial vehicle lands to the landing deck.

Optionally, when detecting the movement route from the charging apparatus to the aerial vehicle according to the instruction signal, the detector is configured to detect a location and a direction of the aerial vehicle after the communication signal is received; and determine the movement route from the charging apparatus to the aerial vehicle according to the location and the direction of the aerial vehicle.

Optionally, when detecting the location and the direction of the aerial vehicle, the detector is configured to detect the location and the direction of the aerial vehicle according to an aerial vehicle positioning mark disposed on the aerial vehicle.

Optionally, the power supply end is configured to cause, by using magnetic attraction, the charging apparatus to complete the charger docking with the charging end disposed on the aerial vehicle when the charging apparatus is close to the aerial vehicle.

Optionally, a power supply end of the charging apparatus and the charging end of the aerial vehicle are provided with a magnetic contact pair, and the magnetic contact pair is used to generate the magnetic attraction when the charging apparatus is close to the aerial vehicle.

Optionally, the charging apparatus includes a charging vehicle.

An embodiment of this disclosure provides a landing pad, including a detection apparatus and a controller, where the detection apparatus is configured to receive an optical signal transmitted by an aerial vehicle located on the landing pad by using an optical signal transmitter; and the controller is configured to determine a received location of the optical signal, and send the received location to a charging apparatus located on the landing pad.

Optionally, the detection apparatus is a movable detection apparatus, and is disposed on an edge of the landing pad.

Optionally, the landing pad is provided with a plurality of landing regions, and the landing regions are respectively used for landing different aerial vehicles.

An embodiment of this disclosure provides an aerial vehicle, including: a controller and a charging end, where the controller is configured to obtain a relative location to a landing deck, control, according to the relative location, the aerial vehicle to land to the landing deck, detect a movement route from the aerial vehicle to a charging apparatus located on the landing deck, and control, according to the movement route, the aerial vehicle to move towards the charging apparatus, and the charging end is configured to complete charger docking with the charging apparatus.

Optionally, when detecting the movement route from the aerial vehicle to the charging apparatus located on the landing deck, the controller is configured to detect a location and a direction of the charging apparatus, and determine the movement route from the aerial vehicle to the charging apparatus according to the location and the direction of the charging apparatus.

Optionally, when detecting the movement route from the aerial vehicle to the charging apparatus located on the landing deck, the controller is configured to detect a location coordinate and a direction of the aerial vehicle, obtain a location coordinate and a direction of the charging apparatus, and determine the movement route from the aerial vehicle to the charging apparatus according to the location coordinate and the direction of the aerial vehicle and the location coordinate and the direction of the charging apparatus.

Optionally, the aerial vehicle is further provided with an optical signal transmitter; the optical signal transmitter is configured to transmit an optical signal; and when detecting the location coordinate and the direction of the aerial vehicle, the controller is configured to detect the location coordinate and the direction of the aerial vehicle according to a received location of the optical signal.

Optionally, when completing the charger docking with the charging apparatus, the charging end is configured to complete, by using magnetic attraction, the charger docking with the charging apparatus when the aerial vehicle is close to the charging apparatus.

An embodiment of this disclosure provides a charging apparatus, where the charging apparatus is located on a landing deck, and includes: a controller and a power supply end; the controller is configured to wait for the aerial vehicle to move towards the charging apparatus according to a movement route to the charging apparatus after the aerial vehicle lands to the landing deck; and the power supply end is configured to complete charger docking with a charging end disposed on the aerial vehicle.

Optionally, when completing the charger docking with the charging end disposed on the aerial vehicle, the power supply end is configured to complete the charger docking with the charging end disposed on the aerial vehicle when the aerial vehicle is close to the charging apparatus.

An embodiment of this disclosure provides a landing pad, including a detection apparatus and a controller, where the detection apparatus is configured to receive an optical signal transmitted by an aerial vehicle located on the landing pad by using an optical signal transmitter; and the controller is configured to determine a received location of the optical signal, and send the received location to the aerial vehicle.

Optionally, the detection apparatus is a movable detection apparatus, and is disposed on an edge of the landing pad.

Optionally, the landing pad is provided with a plurality of landing regions, and the landing regions are respectively used for landing different aerial vehicles.

According to another aspect, a method for charging an aerial vehicle is implementable by an aerial vehicle and may comprise: obtaining a relative location of the aerial vehicle to a landing deck, and landing to the landing deck according to the relative location; sending an instruction signal to a charging apparatus located on the landing deck, to cause the charging apparatus to detect a movement route from the charging apparatus to the aerial vehicle; and docking to the charging apparatus via a charging end of the aerial vehicle.

In some embodiments, the aerial vehicle further comprises at least one optical signal transmitter; and the sending an instruction signal to a charging apparatus located on the landing deck comprises: transmitting an optical signal by using the optical signal transmitter. In one example, the at least one optical signal transmitter comprises two optical signal transmitters, and the transmitting an optical signal by using the optical signal transmitter comprises: transmitting two beams of optical signals of different wavelengths respectively by using the two optical signal transmitters to cause the charging apparatus to detect an overlapping region of the two beams of optical signals according to received locations of the two beams of optical signals, and determine the movement route based on the overlapping region. In another example, the optical signal causes the charging apparatus to detect a location and a direction of the aerial vehicle according to a received location of the optical signal, and determine the movement route based on the location and the direction of the aerial vehicle.

In some embodiments, the aerial vehicle comprises an aerial vehicle positioning mark; and the instruction signal comprises a communication signal that causes the charging apparatus to detect a location and a direction of the aerial vehicle according to the aerial vehicle positioning mark and determine the movement route based on the location and the direction of the aerial vehicle.

In some embodiments, docking to the charging apparatus via the charging end comprises: when the charging apparatus is close to the aerial vehicle, causing the charging end to dock under magnetic attraction to the charging apparatus. In one example, the charging end of the aerial vehicle and a power supply end of the charging apparatus are respectively provided with a magnetic contact pair for generating the magnetic attraction.

According to another aspect, a method for charging an aerial vehicle is implementable by a charging apparatus and may comprise: receiving an instruction signal sent by the aerial vehicle after the aerial vehicle lands to a landing deck; detecting a movement route from the charging apparatus to the aerial vehicle according to the instruction signal; moving towards the aerial vehicle according to the movement route; and docking to a charging end of the aerial vehicle.

In some embodiments, the receiving an instruction signal sent by the aerial vehicle after the aerial vehicle lands to a landing deck comprises: receiving an optical signal sent by the aerial vehicle from at least one optical signal transmitter after the aerial vehicle lands to the landing deck. In one example, the detecting a movement route from the charging apparatus to the aerial vehicle according to the instruction signal comprises: detecting a coverage region of the optical signal according to a received location of the optical signal; and the moving towards the aerial vehicle according to the movement route comprises: moving towards the aerial vehicle according to the coverage region. The moving towards the aerial vehicle according to the coverage region comprises: detecting a location and a direction of the aerial vehicle after entering the coverage region; and moving towards the aerial vehicle according to the location and the direction of the aerial vehicle. The at least one optical signal transmitter comprises two optical signal transmitters; the receiving an optical signal sent by the aerial vehicle from at least one optical signal transmitter after the aerial vehicle lands to the landing deck comprises: receiving two beams of optical signals of different wavelengths respectively transmitted by the two optical signal transmitters after the aerial vehicle lands to the landing deck; the detecting a coverage region of the optical signal according to a received location of the optical signal comprises: detecting an overlapping region of the two beams of optical signals according to received locations of the two beams of optical signals; and the moving towards the aerial vehicle according to the coverage region comprises: moving towards the aerial vehicle according to the overlapping region.

In some embodiments, the charging apparatus comprises an optical signal receiver; and the moving towards the aerial vehicle according to the overlapping region comprises: entering the overlapping region; in response to detecting, by using the optical signal receiver, that the charging apparatus has reached an edge of the overlapping region, moving along a zigzag between edges of the overlapping region; and in response to detecting, by using the optical signal receiver, that the charging apparatus has reached a top corner of the overlapping region, moving from the top corner of the overlapping region towards the aerial vehicle.

In some embodiments, the detecting a movement route from the charging apparatus to the aerial vehicle according to the instruction signal comprises: detecting a location and a direction of the aerial vehicle according to a received location of the optical signal; and determining the movement route from the charging apparatus to the aerial vehicle according to the location and the direction of the aerial vehicle.

In some embodiments, the instruction signal comprises a communication signal, and the receiving an instruction signal sent by the aerial vehicle after the aerial vehicle lands to the landing deck comprises: receiving the communication signal sent by the aerial vehicle after the aerial vehicle lands to the landing deck; detecting a location and a direction of the aerial vehicle after the communication signal is received; and determining the movement route from the charging apparatus to the aerial vehicle according to the location and the direction of the aerial vehicle. In one example, the detecting a location and a direction of the aerial vehicle comprises: detecting the location and the direction of the aerial vehicle according to an aerial vehicle positioning mark on the aerial vehicle.

In some embodiments, the docking to a charging end of the aerial vehicle comprises: causing the charging apparatus to dock under magnetic attraction to the charging end on the aerial vehicle.

In some embodiments, the charging apparatus comprises a charging vehicle.

According to another example, a signal receiving method is implementable by a landing pad comprising a detection apparatus and a controller and the method may comprise: receiving, by using the detection apparatus, an optical signal transmitted by an aerial vehicle on the landing pad by using an optical signal transmitter; and determining, by the controller, a received location of the optical signal, and sending the received location to a charging apparatus.

In some embodiments, the detection apparatus is a movable detection apparatus disposed on an edge of the landing pad; and the landing pad comprises a plurality of landing regions for respectively landing different models of aerial vehicles.

According to the foregoing technical solutions, in the embodiments of this disclosure, when an aerial vehicle needs to be charged, the aerial vehicle no longer needs to complete charger docking in a descending process. Instead, the aerial vehicle first lands to a landing deck, and sends an instruction signal to a charging apparatus on the landing deck, so that the charging apparatus detects a movement route to the aerial vehicle and moves towards the aerial vehicle, and the aerial vehicle completes charger docking with the charging apparatus by using a charging end. In view of the above, an alignment process in a three-dimensional space is converted into an alignment process in a two-dimensional space, the required precision in a landing process of the aerial vehicle is alleviated, so that the aerial vehicle and the charging apparatus can automatically implement charger docking without manual intervention, thereby implementing automatic charging to the aerial vehicle.

Moreover, the requirement for the landing deck in the embodiments of this disclosure is relatively low, if the landing deck is smooth. For example, either a smooth ground or a smooth landing pad may be used as the landing deck. The requirement during landing of the aerial vehicle may further be alleviated by increasing the area of the landing deck, and a sub-meter-level (less than 1 meter) error or even a meter-level error is tolerable during landing of the aerial vehicle.

BRIEF DESCRIPTION OF THE DRAWINGS

To describe the technical solutions in the embodiments of this disclosure more clearly, the following briefly describes the accompanying drawings required for describing the embodiments. Apparently, the accompanying drawings in the following description show merely some embodiments of this disclosure, and persons of ordinary skill in the art may still derive other drawings from these accompanying drawings.

DETAILED DESCRIPTION

To enable persons skilled in the art to better understand the technical solutions of this disclosure, the following clearly and completely describes the technical solutions in the embodiments of this disclosure with reference to the accompanying drawings in the embodiments of this disclosure. Apparently, the described embodiments are merely some rather than all of the embodiments of this disclosure. All other embodiments obtained by persons of ordinary skill in the art based on the embodiments of this disclosure without creative efforts shall fall within the protection scope of this disclosure.

Currently, when charging an aerial vehicle such as an unmanned aerial vehicle, a power supply end is usually disposed on a landing pad, and the aerial vehicle implements accurate docking with the power supply end in a process of landing towards the landing pad. That is, when the aerial vehicle lands to the landing pad, a charging end of the aerial vehicle needs to be exactly docked to the power supply end disposed on the landing pad, to implement charging to the aerial vehicle. However, because of effects of environmental factors such as wind power, it is difficult for the aerial vehicle to achieve the required precision, leading to a failure of accurate docking with the charging apparatus. Therefore, during charging, manual intervention is usually needed, and automatic charging cannot be implemented. In addition, the remaining power of the aerial vehicle is usually relatively low when the aerial vehicle needs to be charged. Therefore, in the process of landing and docking, the aerial vehicle may fail to complete charger docking because of the insufficient remaining power, further reducing the feasibility of automatic charging.

To resolve the foregoing problems, one manner is to dispose an auxiliary apparatus such as a V-shaped slideway on the landing pad, and the aerial vehicle lands on the V-shaped slideway and slides on the slideway under gravity, and is finally docked with the power supply end disposed on one end of the slideway. However, in this manner, the aerial vehicle needs to accurately land to the V-shaped slideway, and a centimeter-level precision is still needed. In addition, in the process of sliding on the slideway, the aerial vehicle may topple for reasons such as being stuck or subjected to an external force, and therefore has a potential safety risk.

The technical problem to be solved is to provide a method for charging an aerial vehicle and a related apparatus, so that the required precision in the aerial vehicle landing process can be alleviated when the aerial vehicle needs to be charged, thereby implementing automatic charging to the aerial vehicle. In addition, an auxiliary apparatus such as a slideway does not need to be disposed on the landing deck, thereby reducing the requirement for the landing deck and improving the safety.

Figure 1:
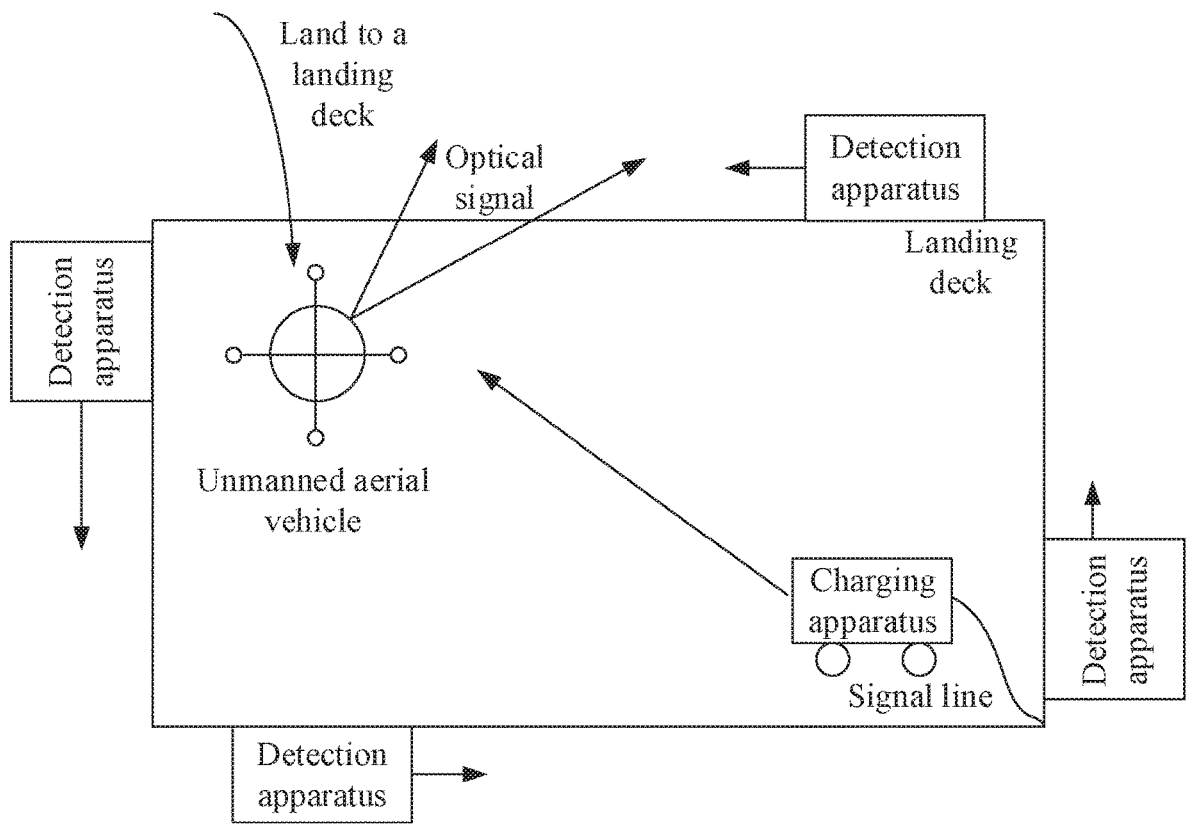
FIG. 1 is a schematic structural diagram of a system for charging an aerial vehicle according to an embodiment of this disclosure.

Before the method for charging an aerial vehicle is introduced, a system for charging an aerial vehicle involved in the embodiments can be first introduced. For example, as shown in FIG. 1, the system for charging an aerial vehicle includes an aerial vehicle, a charging apparatus, and a landing deck. The aerial vehicle is a flying device that can implement an automated driving function. A charging end is disposed on the aerial vehicle. The aerial vehicle receives, via the charging end, power provided by an external device such as a charging apparatus. The charging apparatus is a movable apparatus that can charge the aerial vehicle. For example, the charging apparatus may include a charging vehicle, and the like. The charging apparatus is provided with a power supply end. The charging apparatus outputs power outwards by using the power supply end. The landing deck is a platform configured to enable the aerial vehicle to land for charging, and may be a smooth ground, a smooth landing pad, or the like. The charging apparatus and the aerial vehicle after landing are both located on the landing deck.

When the aerial vehicle needs to be charged, for example, when it is detected that the remaining power of the aerial vehicle is less than a preset threshold, or when a charging instruction is received, the aerial vehicle obtains a relative location to the landing deck, and lands to the landing deck according to the relative location. The aerial vehicle may obtain the relative location of the aerial vehicle to the landing deck by using any one or more positioning technologies of a visual positioning technology, an infrared positioning technology, a sound wave positioning technology, and a global positioning system (GPS) positioning technology. For example, a landing positioning mark is disposed on the landing deck, and the aerial vehicle identifies the landing positioning mark by using the visual positioning technology, to determine the relative location of the aerial vehicle to the landing deck.

Before landing to the landing deck, the aerial vehicle may communicate with the landing pad or the charging apparatus. The landing pad or the charging apparatus verifies the aerial vehicle, and the aerial vehicle is instructed to land only when verification succeeds. Before the aerial vehicle lands to the landing deck or after the aerial vehicle lands to the landing deck, the landing pad or the charging apparatus may further determine the model of the aerial vehicle according to a communication process with the aerial vehicle, and determine, according to the model of the aerial vehicle, a location and a direction of the charging end of the aerial vehicle located in the aerial vehicle, so that the power supply end of the charging apparatus is adjusted according to the location and the direction of the charging end located in the aerial vehicle when the charging apparatus performs charger docking with the aerial vehicle, thereby enabling the charging apparatus to charge aerial vehicles of different models. For example, the charging apparatus determines height information of the charging end located in the aerial vehicle according to the model of the aerial vehicle, to adjust the power supply end of the charging apparatus according to the height information.

After landing to the landing deck, the aerial vehicle may send an instruction signal to the charging apparatus located on the landing deck, where the instruction signal is used to instruct the charging apparatus to detect a movement route from the charging apparatus to the aerial vehicle. In the embodiments, the instruction signal may have various forms, which are illustrated below by examples.

For example, the instruction signal may be an optical signal such as an infrared signal. The aerial vehicle is provided with an optical signal transmitter that can transmit one or more beams of optical signals, such as an infrared transmitter. The landing deck is provided with one or more detection apparatuses and a controller. The detection apparatus receives an optical signal transmitted by the aerial vehicle. The controller determines a received location of the optical signal by the detection apparatus, and sends the received location to the charging apparatus. The charging apparatus may directly detect the location and the direction of the aerial vehicle according to the received location, to determine the movement route to the aerial vehicle, and move towards the aerial vehicle according to the movement route. Alternatively, the charging apparatus may also determine a rough location of the aerial vehicle according to the received location, first move to a region corresponding to the rough location, and starting from the region, move towards the aerial vehicle by using a specific course of action, or detect an accurate location of the aerial vehicle by using the visual positioning technology and move towards the aerial vehicle. The controller may perform wired communication connection with the charging apparatus by using a signal line, or the like, to send information such as the received location to the controller, or the controller may also perform wireless communication connection with the charging apparatus. This is not limited herein. In addition, to reduce the quantity of detection apparatuses, the detection apparatus may be a movable detection apparatus, such as a movable infrared receiver. When the landing deck is a landing pad, the detection apparatus may be disposed on an edge of the landing pad, and may move along the edge of the landing pad, as indicated by the arrow direction of FIG. 1. The controller may be disposed on the bottom of the landing pad. In addition, the landing pad may also provide a power supply, and the like to the charging apparatus.

For another example, the instruction signal may be a communication signal such as a Bluetooth signal, or a wireless fidelity (WiFi) signal. The aerial vehicle sends a communication signal to the charging apparatus by using a communication module. After receiving the communication signal, the charging apparatus detects the location and the direction of the aerial vehicle by using one or more of the visual positioning technology, the infrared positioning technology, the sound wave positioning technology, and the like, determines the movement route from the charging apparatus to the aerial vehicle according to the location and the direction of the aerial vehicle, and moves towards the aerial vehicle according to the movement route.

When the charging apparatus moves towards the aerial vehicle according to the movement route to the aerial vehicle, the aerial vehicle may wait in the same location. When the charging apparatus moves to the nearby of the aerial vehicle, the power supply end of the charging apparatus completes charger docking with the charging end of the aerial vehicle, to implement charging to the aerial vehicle by the charging apparatus. Because the detected movement route may have an error or the charging apparatus may deviate from the detected movement route in the movement process and thus cause a millimeter-level error, to resolve the foregoing problem, when the charging apparatus is close to the aerial vehicle, the aerial vehicle may be caused, by using magnetic attraction, to complete charger docking with the charging apparatus. During implementation, the aerial vehicle and the charging apparatus may be provided with a magnetic contact pair, and the magnetic contact pair is used to generate the magnetic attraction when the charging apparatus is close to the aerial vehicle. The magnetic contact pair refers to two contacts having magnetic attractive forces on each other, and may include two magnetic metal contacts having opposite polarities or include one magnetic metal contact and one nonmagnetic metal contact. For example, the two contacts of the magnetic contact pair may be respectively disposed on the charging apparatus and the aerial vehicle. For example, they are directly disposed on the charging end of the aerial vehicle and the power supply end of the charging apparatus. The magnetic contact pair not only can generate magnetic attraction, but also can complete charger docking by direct contact. Because the magnetic contact pair may have a poor contact, the aerial vehicle or the charging apparatus may detect whether the magnetic contact pair is successfully docked. For example, when it is detected by using a galvanometer, or the like, that a current flows through the magnetic contact pair, it indicates that docking succeeds. Otherwise, when it is detected by using a galvanometer, or the like, that there is no current flowing through, or there is a relatively small current flowing through, it indicates that docking fails. In this case, the location of the charging apparatus or the aerial vehicle may be adjusted until it is detected that there is a current flowing through.

In view of the above, in the embodiments of this disclosure, when an aerial vehicle needs to be charged, the aerial vehicle no longer needs to complete charger docking in a descending process. Instead, the aerial vehicle first lands on a landing deck, and sends an instruction signal to a charging apparatus on the landing deck, so that the charging apparatus detects a movement route to the aerial vehicle and moves towards the aerial vehicle, and the aerial vehicle completes charger docking with the charging apparatus by using a charging end. In view of the above, an alignment process in a three-dimensional space is converted into an alignment process in a two-dimensional space, the required precision in a landing process of the aerial vehicle is alleviated, so that the aerial vehicle and the charging apparatus can automatically implement accurate docking without manual intervention, thereby implementing automatic charging to the aerial vehicle.

In addition, in the embodiments of this disclosure, an auxiliary apparatus such as a slideway does not need to be disposed, if the landing deck is smooth. Therefore, the requirement for the landing deck is relatively low and the safety is also improved. For example, either a smooth ground or a smooth landing pad may be used as the landing deck. The requirement during landing of the aerial vehicle may further be alleviated by increasing the area of the landing deck. For example, a sub-meter-level error or even a meter-level error is tolerable during landing of the aerial vehicle, and the aerial vehicle can complete landing by using a GPS positioning technology.

In addition, the remaining power of the aerial vehicle is usually relatively small when the aerial vehicle needs to be charged. In some embodiments, after landing to the landing deck, the aerial vehicle does not need to continue moving, and only needs to wait in the same location for the charging apparatus to move towards the aerial vehicle, to prevent failing to complete by the aerial vehicle charger docking because of the insufficient remaining power, thereby further improving the feasibility of automatic charging.

The method for charging an aerial vehicle provided is described in detail below.

Figure 2:
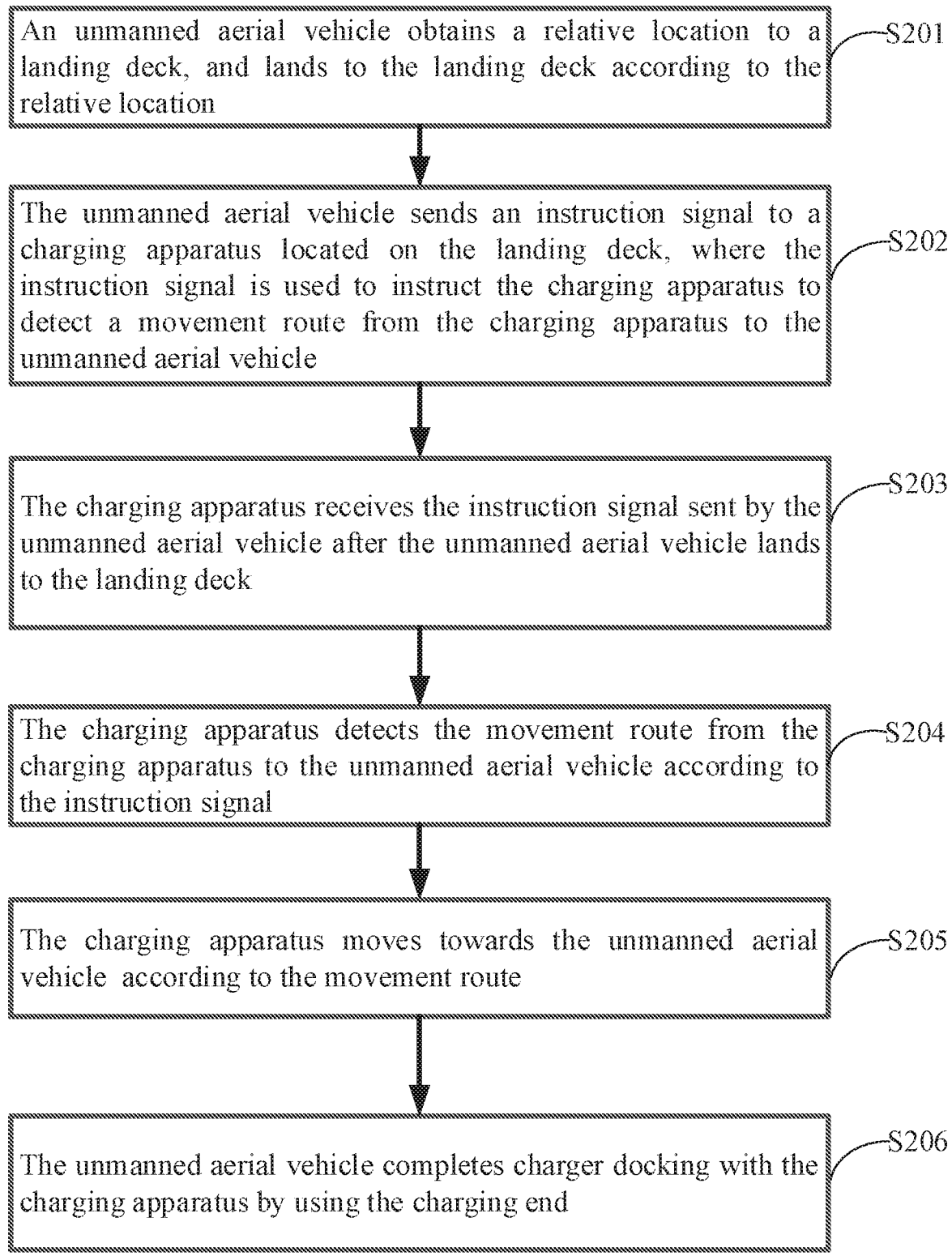
FIG. 2 is a schematic flowchart of an embodiment of a method for charging an aerial vehicle according to an embodiment of this disclosure.

Referring to FIG. 2, in some embodiments, a method for charging an aerial vehicle is provided. This embodiment may be applied to the charging system shown in FIG. 1. The method of this embodiment includes:

S201: An aerial vehicle (e.g., unmanned aerial vehicle such as drone) obtains a relative location (of the aerial vehicle) to a landing deck, and lands to the landing deck according to the relative location.

When the aerial vehicle needs to be charged, for example, when it is detected that the remaining power of the aerial vehicle is less than a preset threshold, or a charging instruction is received, the aerial vehicle first lands to the landing deck. During landing of the aerial vehicle, the location of the charging apparatus does not need to be considered. That is, charger docking does not need to be completed in the landing process. Therefore, in this embodiment, the requirement during landing of the aerial vehicle can be alleviated.

Figure 3:
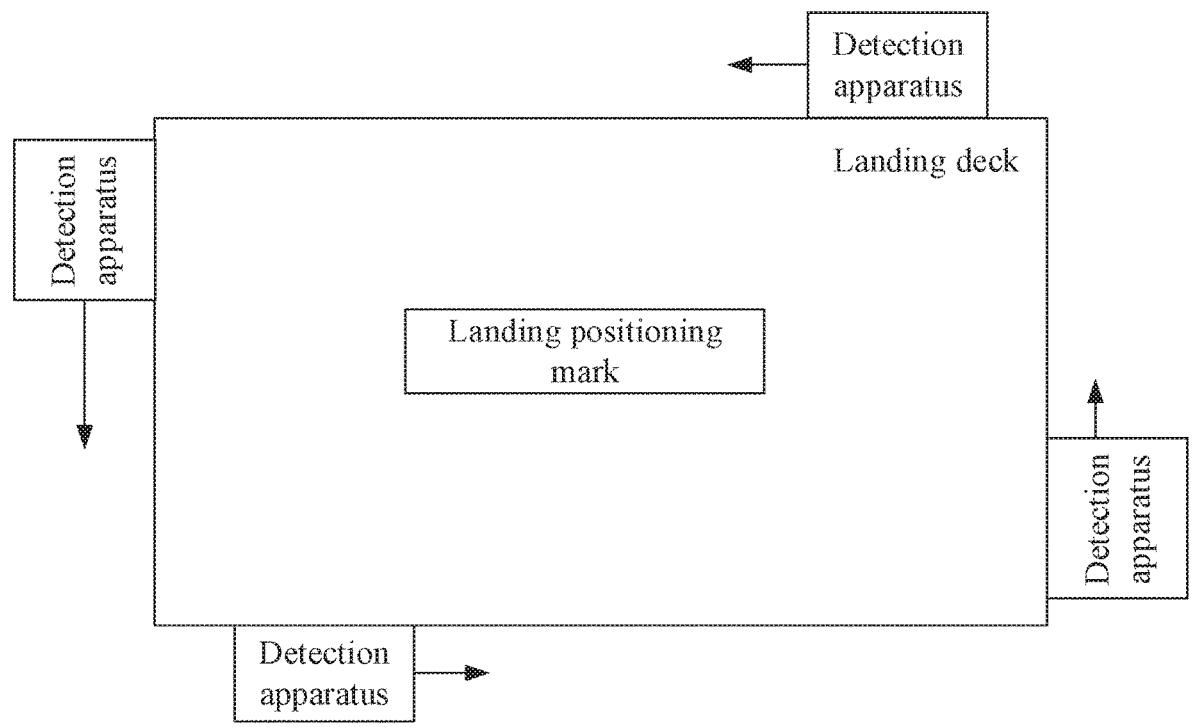
FIG. 3 is a schematic structural diagram of a landing deck according to an embodiment of this disclosure.

The aerial vehicle needs to obtain the relative location from the aerial vehicle to the landing deck before landing. The aerial vehicle may obtain the relative location by using any one or more of: a visual positioning technology, an infrared positioning technology, a sound wave positioning technology, and a GPS positioning technology. For example, as shown in FIG. 3, a landing positioning mark is disposed on the landing deck. The aerial vehicle identifies the landing positioning mark by using the visual positioning technology, to determine the relative location from the aerial vehicle to the landing deck.

S202: The aerial vehicle sends an instruction signal to a charging apparatus located on the landing deck, where the instruction signal is used to instruct the charging apparatus to detect a movement route from the charging apparatus to the aerial vehicle.

In some embodiments, the instruction signal may have various forms. For example, the instruction signal may be an optical signal such as an infrared signal, or a communication signal.

When the instruction signal is an optical signal such as an infrared signal, the aerial vehicle is provided with an optical signal transmitter that can transmit one or more beams of optical signals, such as an infrared transmitter. The landing deck is provided with one or more detection apparatuses and a controller. At least one of the detection apparatuses receives an optical signal transmitted by the aerial vehicle. The controller determines a received location of the optical signal by the detection apparatus, and sends the received location to the charging apparatus. When the instruction signal is a communication signal, the aerial vehicle sends the communication signal to the charging apparatus by using a communication module.

The detection apparatus may be a movable detection apparatus such as a movable infrared receiver. When the landing deck is a landing pad, the detection apparatus may be disposed on an edge of the landing pad, and may move along the edge of the landing pad, as indicated by the arrow direction of FIG. 3.

The charging apparatus may be a movable apparatus that can charge the aerial vehicle. For example, the charging apparatus may include a charging vehicle, and the like. The charging vehicle may be provided with a differential gear.

S203: The charging apparatus receives the instruction signal sent by the aerial vehicle after the aerial vehicle lands to the landing deck.

When the instruction signal is an optical signal such as an infrared signal, the optical signal may be received by using the detection apparatus disposed on the landing deck. The controller disposed on the landing deck determines the received location of the optical signal. The charging apparatus receives the received location of the optical signal sent by the controller. The controller may perform wired communication connection with the charging apparatus by using a signal line, or the like, to receive the received location sent by the controller, or the controller may also perform wireless communication connection with the charging apparatus.

When the instruction signal is a communication signal such as a Bluetooth signal or a WiFi signal, the charging apparatus receives the communication signal sent by the aerial vehicle by using a communication module.

S204: The charging apparatus detects the movement route from the charging apparatus to the aerial vehicle according to the instruction signal.

When the instruction signal is an optical signal such as an infrared signal, the charging apparatus may directly detect a location and a direction of the aerial vehicle according to the received location of the optical signal, to determine a movement route to the aerial vehicle. Alternatively, the charging apparatus may also determine a rough location of the aerial vehicle according to the received location, first move to a region corresponding to the rough location, and start from the region, move towards the aerial vehicle by using a specific course of action, or detect an accurate location of the aerial vehicle by using the visual positioning technology and move towards the aerial vehicle.

When the instruction signal is a communication signal such as a Bluetooth signal or a WiFi signal, after receiving the communication signal, the charging apparatus may detect the location and the direction of the aerial vehicle by using one or more of: the visual positioning technology, the infrared positioning technology, the sound wave positioning technology, and the like. For example, the charging apparatus identifies an aerial vehicle positioning mark on the aerial vehicle by using the visual positioning technology, and detects the location and the direction of the aerial vehicle according to the aerial vehicle positioning mark, to determine the movement route from the charging apparatus to the aerial vehicle according to the location and the direction of the aerial vehicle.

S205: The charging apparatus moves towards the aerial vehicle according to the movement route.

After landing to the landing deck, the aerial vehicle may wait for the charging apparatus to move towards the aerial vehicle according to the movement route.

S206: The aerial vehicle completes charger docking with the charging apparatus by using the charging end. The charger docking may refer to the aerial vehicle docking to the charging apparatus (e.g., via a charging end of the aerial vehicle), the charging apparatus docking to the charging apparatus (e.g., via the charging end of the aerial vehicle), or the charging apparatus and the charging apparatus docking to each other.

When the charging apparatus moves to the nearby of the aerial vehicle, a power supply end of the charging apparatus completes charger docking with the charging end of the aerial vehicle, to implement charging to the aerial vehicle by the charging apparatus. The power supply end and the charging end may perform contact charger docking. For example, the charging end and the power supply end each include two metal contacts. The two metal contacts of the charging end come into direct contact with the two metal contacts of the power supply end, to complete charger docking. Alternatively, the power supply end and the charging end may also perform noncontact charger docking. For example, the charging end and the power supply end perform wireless charger docking.

Before the aerial vehicle lands to the landing deck or after the aerial vehicle lands to the landing deck, the landing pad or the charging apparatus may further determine the model of the aerial vehicle according to a communication process with the aerial vehicle, and determine, according to the model of the aerial vehicle, a location and a direction of the charging end of the aerial vehicle located in the aerial vehicle, so that the power supply end of the charging apparatus is adjusted according to the location and the direction of the charging end located in the aerial vehicle when the charging apparatus performs charger docking with the aerial vehicle, thereby enabling the charging apparatus to charge aerial vehicles of different models.

In some embodiments, before the charging apparatus performs charger docking, the location of the charging end on the aerial vehicle may be determined according to the model of the aerial vehicle, a preset location of the charging end on the aerial vehicle, or in a manner such as the visual positioning technology, and charger docking is completed according to the location. In addition, when the aerial vehicle transmits an optical signal by using an optical signal transmitter, if the distance between the optical signal transmitter and the charging end is relatively short, the movement route detected according to the received location of the optical signal may be approximately used as the movement route from the charging apparatus to the charging end of the aerial vehicle.

In some embodiments, an alignment process in a three-dimensional space is converted into an alignment process in a two-dimensional space. Therefore, the required precision in a landing process of the aerial vehicle is alleviated, so that the aerial vehicle and the charging apparatus can automatically implement accurate docking without manual intervention, thereby implementing automatic charging to the aerial vehicle. In addition, an auxiliary apparatus such as a slideway does not need to be disposed, if the landing deck is smooth. Therefore, the requirement for the landing deck is relatively low. In addition, after landing to the landing deck, the aerial vehicle does not need to continue moving, and only needs to wait in the same location for the charging apparatus to move towards the aerial vehicle, to avoid failing to complete by the aerial vehicle charger docking because of the insufficient remaining power, thereby further improving the feasibility of automatic charging.

In some embodiments, when the instruction signal is an optical signal such as an infrared signal, the charging apparatus may detect the movement route to the aerial vehicle according to the received location of the optical signal. Two detection manners of the movement route are provided below.

In one detection manner, the aerial vehicle transmits an optical signal by using the optical signal transmitter; the detection apparatus receives the optical signal; the controller determines the received location of the optical signal; the charging apparatus directly detects the location and the direction of the aerial vehicle according to the received location of the optical signal, to determine the movement route to the aerial vehicle.

The description below uses infrared signal as an example for the optical signal. It can be understood that the specific representation form of the optical signal is not limited herein.

Figure 4:
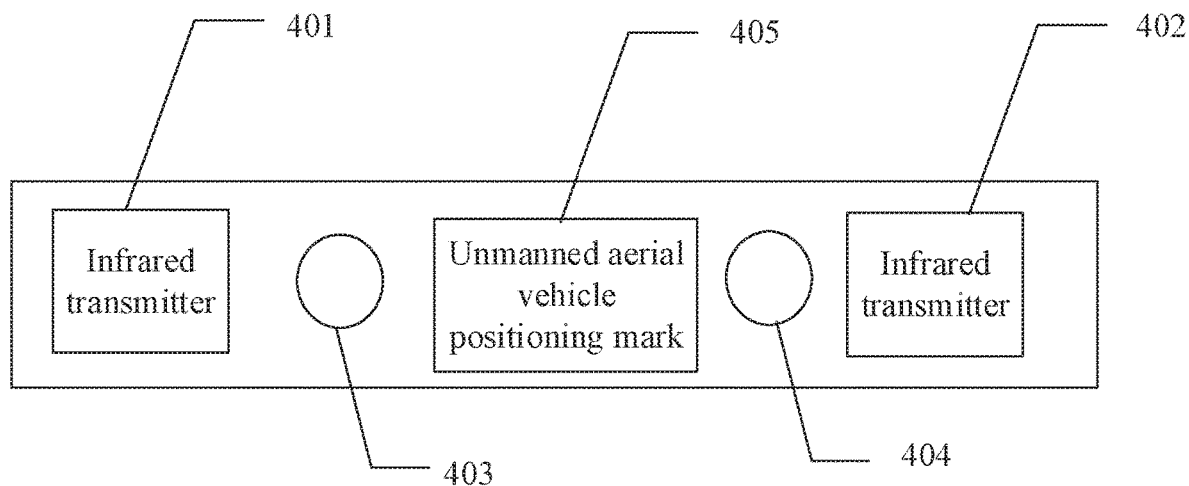
FIG. 4 is a schematic structural diagram of an aerial vehicle according to an embodiment of this disclosure.

For example, as shown in FIG. 4, the aerial vehicle may be provided with an infrared transmitter 401 and an infrared transmitter 402, each being capable of transmitting an infrared signal. The landing pad may be provided with a movable infrared receiver and a controller (not shown). The movable infrared receiver can receive an infrared signal transmitted by the infrared transmitter when moving, and the controller determines a received location of the infrared signal by the infrared receiver. The aerial vehicle may further be provided with two charging contacts: a positive contact 403 and a negative contact 404.

Figure 6:
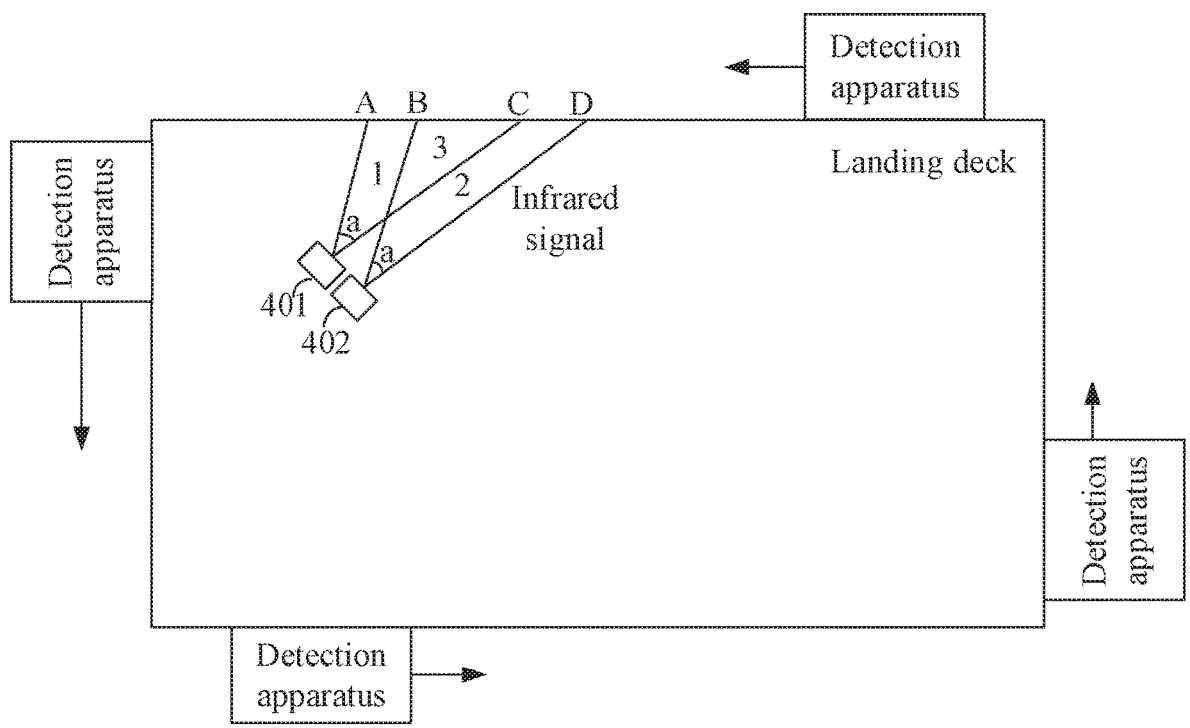
FIG. 6 is a schematic diagram of transmitting an infrared signal by an aerial vehicle according to an embodiment of this disclosure.

As shown in FIG. 6, the infrared transmitter 401 and the infrared transmitter 402 each transmit an infrared signal with an angle a (e.g., 20°), and the infrared signals transmitted by the infrared transmitter 401 and the infrared transmitter 402 have different wavelengths. The controller can determine received locations A, B, C, and D of the infrared signals by infrared receiver. The coverage of the infrared signal transmitted by the infrared transmitter 401 includes region 1 and region 3. The coverage of the infrared signal transmitted by the infrared transmitter 402 includes region 2 and region 3. Region 3 is an overlapping region of the infrared signals. The location and the direction of the aerial vehicle are calculated according to the received locations A, B, C, and D. One detailed calculation manner is described below with reference to FIG. 7.

Figure 7:
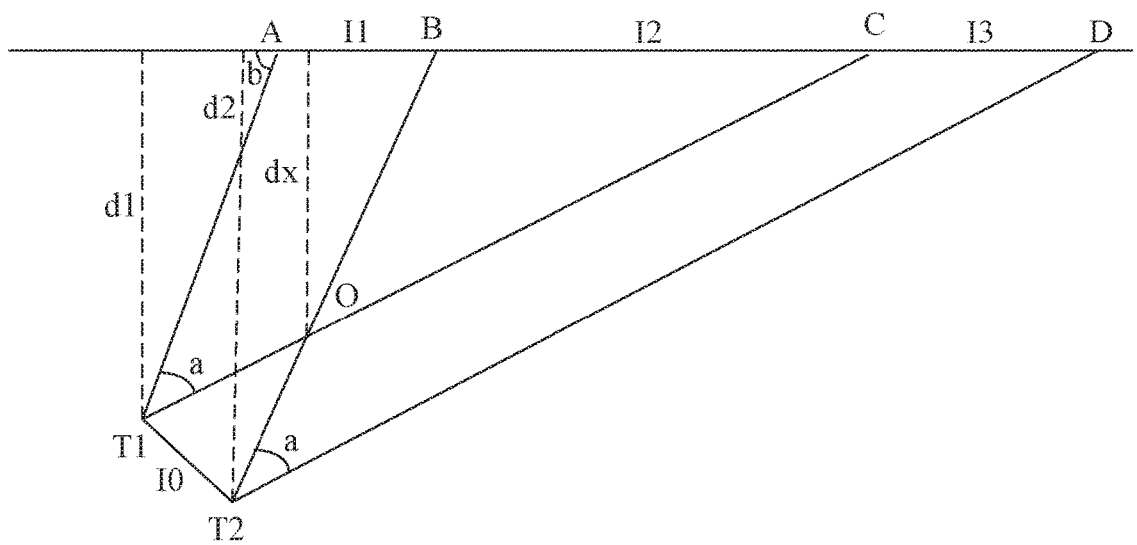
FIG. 7 is a schematic diagram of a location of an infrared transmitter according to an embodiment of this disclosure.

In FIG. 7, T1 and T2 are respectively signal transmission points of the infrared transmitter 401 and the infrared transmitter 402. The distance between T1 and T2 is I0. The distance between the received location A and the received location B is I1. The distance between the received location B and the received location C is I2. The distance between the received location C and the received location D is I3. The distance between T1 and a straight line on which ABCD are located is d1. The distance between T2 and the straight line on which ABCD are located is d2. The distance between a vertex O of the region 3 and the straight line on which ABCD are located is dx.

According to the triangular geometrical relationship in FIG. 7, it can be determined that:

$$d1 = dx \times (I1 + I2)/I2$$

$$d2 = dx \times (I2 + I3)/I2$$

$$\begin{aligned}dx &= CO \times BO \times \cos(a)/I2 \\ &= ((I2/I1) \times I0 \times [\cos(a/2)/\sin(a)] \times \\ & \quad [(I2/I3) \times I0 \times (\cos(a/2))/\sin(a)) \times \cos(a)/I2 \\ &= [I0 \times I0 \times I2/(I1 \times I3)] \times \cos(a) \times [\cos(a/2)/\sin(a)]2\end{aligned}$$

Therefore, the value of dx is substituted into the formulas of d1 and d2, so that the values of d1 and d2 can be calculated.

According to the values of d1 and d2, an angle b and lengths of AT1 and BT2 in FIG. 7 can be determined to obtain the directions and locations of T1 and T2. Because the distance between T1 and T2 and the charging contacts is relatively short, the locations of T1 and T2 may be approximately used as locations of the charging contacts.

In another detection manner, the charging apparatus may determine a rough location of the aerial vehicle according to the received location, first move to a region corresponding to the rough location, and start from the region, move towards the aerial vehicle by using a specific course of action, or detect an accurate location of the aerial vehicle by using the visual positioning technology and move towards the aerial vehicle.

The description below uses infrared signal as an example for the optical signal. It can be understood that the specific form of the optical signal is not limited in this embodiment.

In some embodiments, the aerial vehicle may be provided with an infrared transmitter. An infrared signal is transmitted by using the infrared transmitter. A coverage region of the infrared signal is detected according to the received location of the infrared signal. Movement towards the aerial vehicle is performed according to the coverage region.

Figure 5:
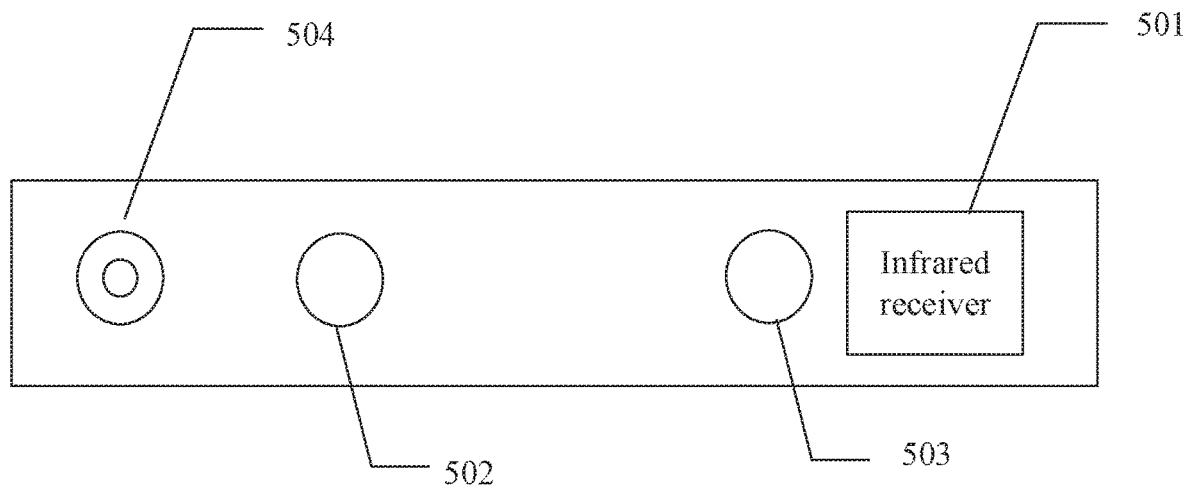
FIG. 5 is a schematic structural diagram of a charging apparatus according to an embodiment of this disclosure.

For example, after entering the coverage region, the charging apparatus may detect the location and the direction of the aerial vehicle by for example the visual positioning technology, and moves towards the aerial vehicle according to the location and the direction of the aerial vehicle. In an implementation, the charging apparatus may be, as shown in FIG. 5, provided with a camera 504. In addition, the aerial vehicle is provided with an aerial vehicle positioning mark 405. After entering the coverage region, the charging apparatus collects the aerial vehicle positioning mark 405 by using the camera 504, to detect the location and the direction of the aerial vehicle.

For another example, after entering the coverage region, the charging apparatus may move towards the aerial vehicle by using a specific course of action.

For example, the aerial vehicle transmits at least two beams of optical signals by using the optical signal transmitter. The wavelengths of the at least two beams of optical signals are different. The charging apparatus receives the at least two beams of optical signals by using the detection apparatus, detects an overlapping region of the at least two beams of optical signals according to received locations of the at least two beams of optical signals, and moves towards the aerial vehicle according to the overlapping region. The charging apparatus may be provided with an optical signal receiver such as an infrared receiver. The charging apparatus enters the overlapping region, in response to detecting by using the optical signal receiver that the charging apparatus has reached an edge of the overlapping region, moves along a zigzag between edges of the overlapping region, and in response to detecting by using the optical signal receiver that the charging apparatus has reached a top corner of the overlapping region, moves from the top corner of the overlapping region towards the aerial vehicle.

For example, as shown in FIG. 4, the aerial vehicle may be provided with the infrared transmitter 401 and the infrared transmitter 402 each transmitting an infrared signal. The infrared signals transmitted by the infrared transmitter 401 and the infrared transmitter 402 have different wavelengths. The coverage of the infrared signal transmitted by the infrared transmitter 401 includes region 1 and region 3. The coverage of the infrared signal transmitted by the infrared transmitter 402 includes region 2 and region 3. Region 3 is an overlapping region of the infrared signals. As shown in FIG. 5, the charging apparatus is provided with an infrared receiver 501. The charging apparatus may further be provided with two charging contacts: a positive contact 502 and a negative contact 503.

Figure 8:
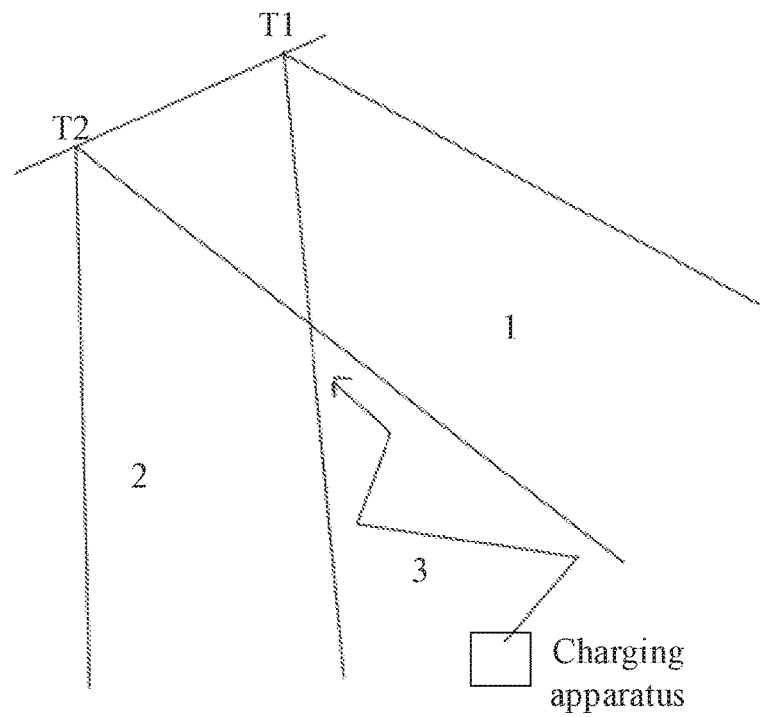
FIG. 8 is a schematic diagram of a movement route of a charging apparatus according to an embodiment of this disclosure.

As shown in FIG. 8, after entering the region 3, the charging apparatus moves in a straight line towards the aerial vehicle. When it is detected by using the infrared receiver 501 that the charging apparatus has entered the region 1 or the region 2, that is, the infrared receiver 501 receives an infrared signal of only one wavelength, the charging apparatus changes a movement direction and continues to move in a straight line. Therefore, the charging apparatus may move in a zigzag route in the region 3. When it is detected by using the infrared receiver 501 that a top corner of the region 3 is reached, that is, the infrared receiver 501 cannot receive any infrared signal, the charging apparatus may move towards the aerial vehicle by using the visual positioning technology, or the charging apparatus may also move forwards in a straight line to get close to the aerial vehicle. In the movement process of the charging apparatus, the movement route may be adjusted by using the visual positioning technology, or movement may also be performed with reference to the calculated d1 and d2 in FIG. 7. Because the distance between T1, T2 and the charging contacts is relatively short, the movement route from the charging apparatus to T1 and T2 may be approximately used as the movement route to the charging contacts.

In some embodiments, a plurality of aerial vehicles may also be simultaneously charged. For example, the landing deck is provided with a plurality of charging apparatuses that can charge different aerial vehicles. To prevent the charging apparatus from collision in the movement process, the charging apparatus may be provided with an obstacle avoiding sensor such as an ultrasonic sensor, or the landing deck may also be provided with a plurality of landing regions for respectively landing different aerial vehicles. Each charging apparatus moves in a corresponding landing region to avoid collision. The landing regions may use different landing positioning marks.

In some embodiments, a signal receiving method is provided, where the method is applied to a landing pad, the landing pad is provided with a detection apparatus and a controller, and the method includes:

receiving, by using the detection apparatus, an optical signal transmitted by an aerial vehicle located on the landing pad by using an optical signal transmitter; and determining, by the controller, a received location of the optical signal, and sending the received location to a charging apparatus located on the landing pad.

Optionally, the detection apparatus is a movable detection apparatus, and is disposed on an edge of the landing pad.

Optionally, the landing pad is provided with a plurality of landing regions, and the landing regions are respectively used for landing different aerial vehicles.

Figure 9:
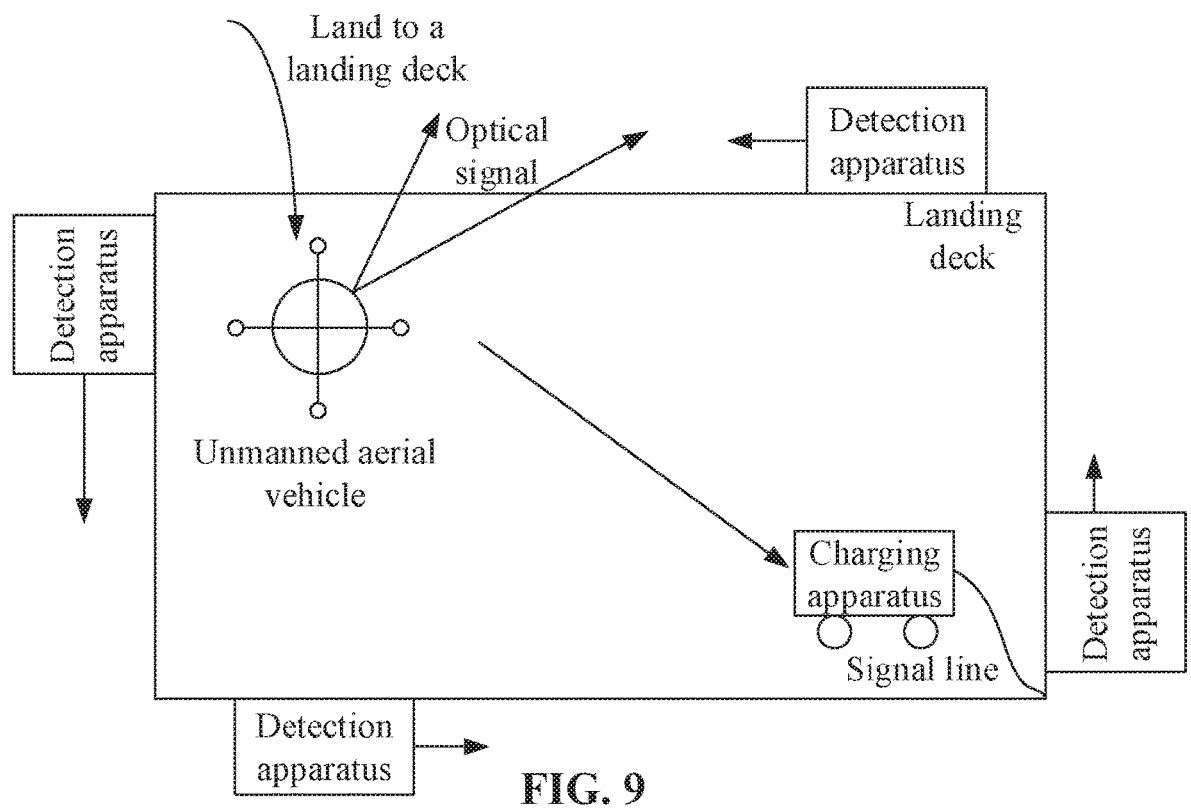
FIG. 9 is another schematic structural diagram of a system for charging an aerial vehicle according to an embodiment of this disclosure.

In some embodiments, after landing to the landing deck, the aerial vehicle may also move towards the charging apparatus, to complete charger docking. Details are shown in FIG. 9.

Figure 10:
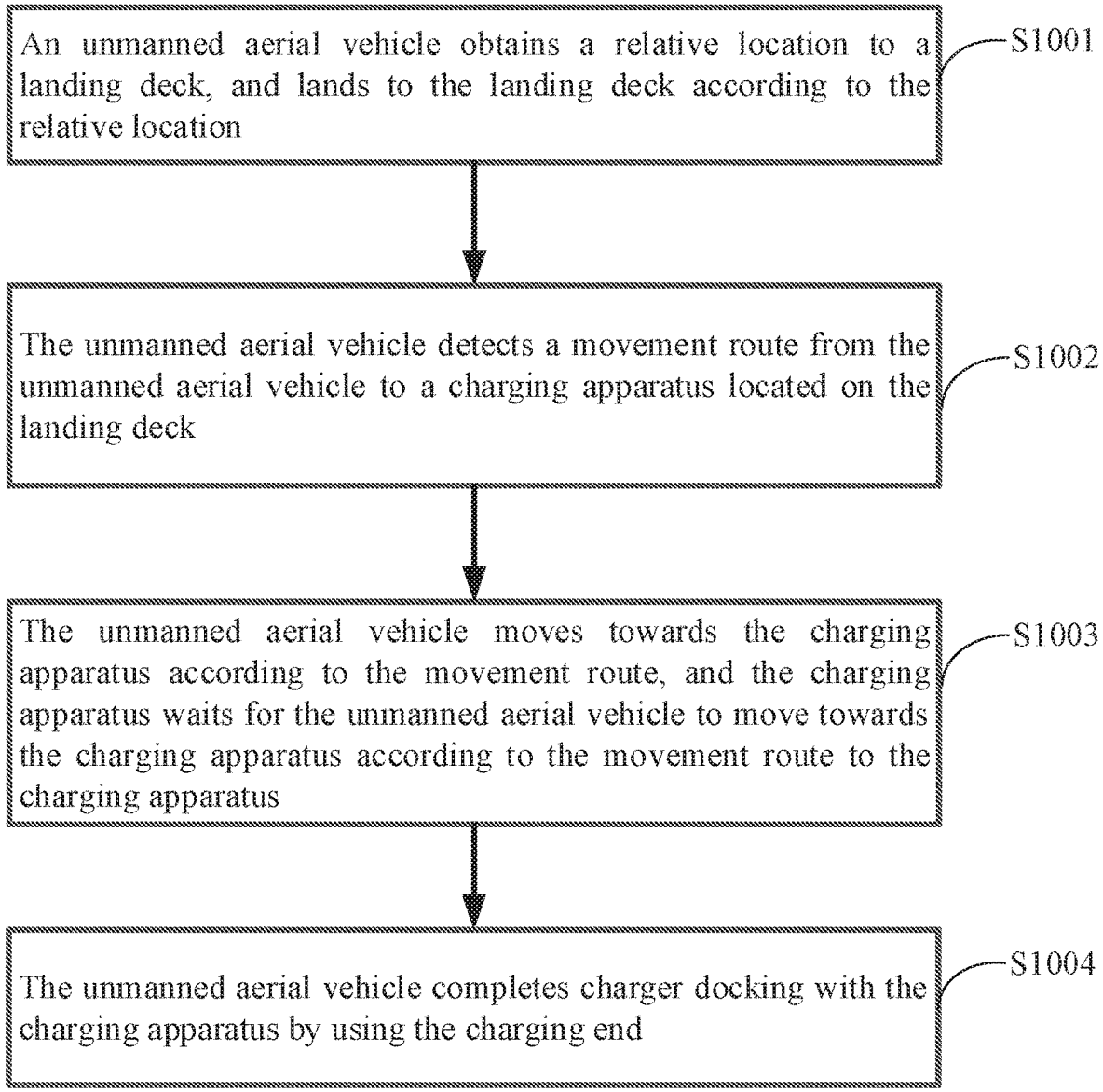
FIG. 10 is a schematic flowchart of another embodiment of a method for charging an aerial vehicle according to an embodiment of this disclosure.

Referring to FIG. 10, in some embodiments, another embodiment of a method for charging an aerial vehicle is provided. The method includes:

S1001: An aerial vehicle obtains a relative location to a landing deck, and lands to the landing deck according to the relative location.

S1002: The aerial vehicle detects a movement route from the aerial vehicle to a charging apparatus located on the landing deck.

S1003: The aerial vehicle moves towards the charging apparatus according to the movement route, and the charging apparatus waits for the aerial vehicle to move towards the charging apparatus according to the movement route to the charging apparatus.

S1004: The aerial vehicle completes charger docking with the charging apparatus by using the charging end.

Optionally, the aerial vehicle detects a location and a direction of the charging apparatus by using any one or more of: a visual positioning technology, an infrared positioning technology, a sound wave positioning technology, and the like, and determines the movement route from the aerial vehicle to the charging apparatus according to the location and the direction of the charging apparatus.

Optionally, the aerial vehicle detects a location coordinate and a direction of the aerial vehicle. For example, an optical signal is transmitted by using an optical signal transmitter disposed on the aerial vehicle, and the location coordination and the direction of the aerial vehicle are detected according to a received location of the optical signal. In addition, a location coordinate and a direction of the charging apparatus are obtained, and the movement route from the aerial vehicle to the charging apparatus is determined according to the location coordinate and the direction of the aerial vehicle and the location coordinate and the direction of the charging apparatus. The location coordinate and the direction of the charging apparatus may be preset, or may be detected by using a positioning technology.

Optionally, completing charger docking with the charging apparatus by using the charging end includes: when the aerial vehicle is close to the charging apparatus, causing, by using magnetic attraction, the charging end to complete the charger docking with the charging apparatus.

Reference may be made to the related description of the embodiment shown in FIG. 2 for details of the related content of this embodiment, which are not described herein again. The charging apparatus of this embodiment may be a fixed charging apparatus such as a charging station.

In some embodiments, a signal receiving method is provided, where the method is applied to a landing pad, the landing pad is provided with a detection apparatus and a controller, and the method includes:

receiving, by using the detection apparatus, an optical signal transmitted by an aerial vehicle located on the landing pad by using an optical signal transmitter; and determining, by the controller, a received location of the optical signal, and sending the received location to the aerial vehicle.

Optionally, the detection apparatus is a movable detection apparatus, and is disposed on an edge of the landing pad.

Optionally, the landing pad is provided with a plurality of landing regions, and the landing regions are respectively used for landing different aerial vehicles.

Figure 11:
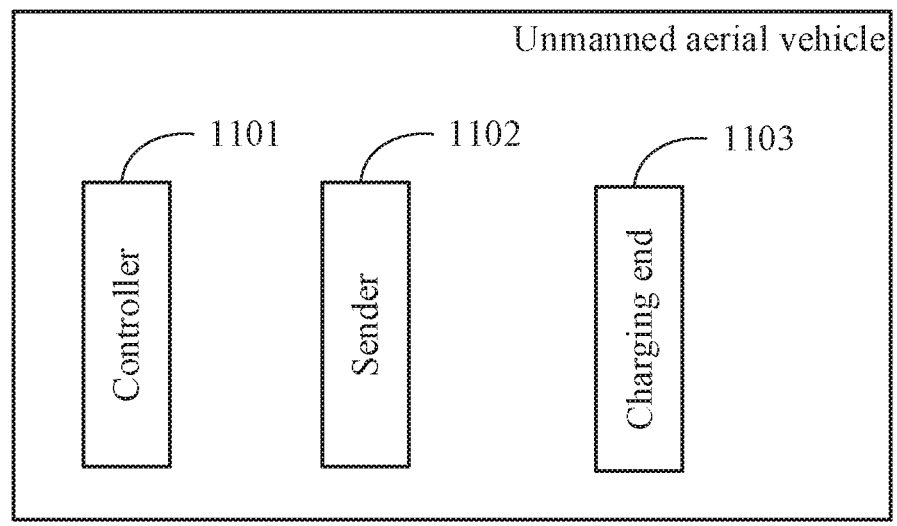
FIG. 11 is another schematic structural diagram of an aerial vehicle according to an embodiment of this disclosure.

FIG. 11 is another schematic structural diagram of an aerial vehicle according to an embodiment of this disclosure. The aerial vehicle includes: a controller 1101, a sender 1102, and a charging end 1103, where:

the controller 1101 is configured to obtain a relative location to a landing deck, and control, according to the relative location, the aerial vehicle to land to the landing deck;

the sender 1102 is configured to send an instruction signal to a charging apparatus located on the landing deck, where the instruction signal is used to instruct the charging apparatus to detect a movement route from the charging apparatus to the aerial vehicle; and the charging end 1103 is configured to complete charger docking with the charging apparatus.

Optionally, the controller 1101 is further configured to wait for the charging apparatus to move towards the aerial vehicle according to the movement route before the charging end 1103 completes the charger docking with the charging apparatus.

Optionally, the sender 1102 includes an optical signal transmitter; and the optical signal transmitter is configured to transmit an optical signal.

Optionally, the optical signal is used to instruct the charging apparatus to detect a coverage area of the optical signal according to a received location of the optical signal, and for waiting for the charging apparatus to move towards the aerial vehicle according to the movement route, the controller 1101 is configured to wait for the charging apparatus to move towards the aerial vehicle according to the movement route determined by the coverage region.

Optionally, the optical signal transmitter is configured to transmit at least two beams of optical signals, where wavelengths of the at least two beams of optical signals are different, and the at least two beams of optical signals are used to instruct the charging apparatus to detect an overlapping region of the at least two beams of optical signals according to received locations of the at least two beams of optical signals, and for waiting for the charging apparatus to move towards the aerial vehicle according to the movement route determined by the coverage region, the controller 1101 is configured to wait for the charging apparatus to move towards the aerial vehicle according to the movement route determined by the overlapping region.

Optionally, the optical signal is used to instruct the charging apparatus to detect a location and a direction of the aerial vehicle according to a received location of the optical signal, and for waiting for the charging apparatus to move towards the aerial vehicle according to the movement route, the controller 1101 is configured to wait for the charging apparatus to move towards the aerial vehicle according to the movement route determined by the location and the direction of the aerial vehicle.

Optionally, the sender 1102 includes: a communication module, and the communication module is configured to send a communication signal to the charging apparatus.

Optionally, the communication signal is used to instruct the charging apparatus to detect a location and a direction of the aerial vehicle, and for waiting for the charging apparatus to move towards the aerial vehicle according to the movement route, the communication module is configured to wait for the charging apparatus to move towards the aerial vehicle according to the movement route determined by the location and the direction of the aerial vehicle.

Optionally, the aerial vehicle is further provided with an aerial vehicle positioning mark, and the communication signal is used to instruct the charging apparatus to detect the location and the direction of the aerial vehicle according to the aerial vehicle positioning mark.

Optionally, the charging end 1103 is configured to cause, by using magnetic attraction, the charging end 1103 to complete the charger docking with the charging apparatus when the charging apparatus is close to the aerial vehicle.

Optionally, the charging end 1103 of the aerial vehicle and a power supply end of the charging apparatus are provided with a magnetic contact pair, and the magnetic contact pair is used to generate the magnetic attraction when the charging apparatus is close to the aerial vehicle.

Reference may be made to related description of related features in the embodiments corresponding to FIG. 1 to FIG. 10 for various features in the embodiment corresponding to FIG. 11. Details are not described herein again.

In view of the above, an alignment process in a three-dimensional space is converted into an alignment process in a two-dimensional space. Therefore, the required precision in a landing process of the aerial vehicle is alleviated, so that the aerial vehicle and the charging apparatus can automatically implement accurate docking without manual intervention, thereby implementing automatic charging to the aerial vehicle. In addition, an auxiliary apparatus such as a slideway does not need to be disposed, if the landing deck is smooth. Therefore, the requirement for the landing deck is relatively low. In addition, after landing to the landing deck, the aerial vehicle does not need to continue moving, and only needs to wait in the same location for the charging apparatus to move towards the aerial vehicle, to avoid failing to complete by the aerial vehicle charger docking because of the insufficient remaining power, thereby further improving the feasibility of automatic charging.

Figure 12:
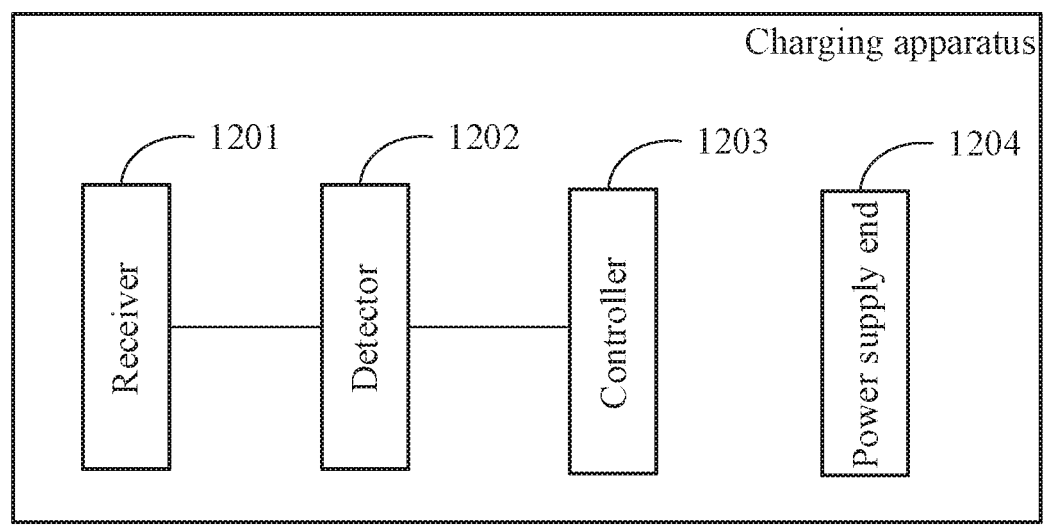
FIG. 12 is another schematic structural diagram of a charging apparatus according to an embodiment of this disclosure.

FIG. 12 is another schematic structural diagram of a charging apparatus according to an embodiment of this disclosure. The charging apparatus is located on a landing deck, and includes: a receiver 1201, a detector 1202, a controller 1203, and a power supply end 1204, where:

the receiver 1201 is configured to receive an instruction signal sent by an aerial vehicle after the aerial vehicle lands to the landing deck;

the detector 1202 is configured to detect a movement route from the charging apparatus to the aerial vehicle according to the instruction signal;

the controller 1203 is configured to control the charging apparatus to move towards the aerial vehicle according to the movement route; and the power supply end 1204 is configured to complete charger docking with a charging end disposed on the aerial vehicle.

Optionally, the receiver 1201 is configured to receive an optical signal sent by the aerial vehicle by using an optical signal transmitter after the aerial vehicle lands to the landing deck.

Optionally, the detector 1202 is configured to detect a coverage region of the optical signal according to a received location of the optical signal, and the controller 1203 is configured to control the charging apparatus to move towards the aerial vehicle according to the coverage region.

Optionally, when the charging apparatus moves towards the aerial vehicle according to the coverage region, the controller 1203 is configured to detect a location and a direction of the aerial vehicle after the control apparatus enters the coverage region, and control the charging apparatus to move towards the aerial vehicle according to the location and the direction of the aerial vehicle.

Optionally, when receiving the optical signal sent by the aerial vehicle by using the optical signal transmitter after the aerial vehicle lands to the landing deck, the receiver 1201 is configured to receive at least two beams of optical signals transmitted by the aerial vehicle by using the optical signal transmitter after the aerial vehicle lands to the landing deck, where wavelengths of the at least two beams of optical signals are different;

for detecting the coverage region of the optical signal according to the received location of the optical signal, the detector 1202 is configured to detect an overlapping region of the at least two beams of optical signals according to received locations of the at least two beams of optical signals; and for controlling the charging apparatus to move towards the aerial vehicle according to the coverage region, the controller 1203 is configured to control the charging apparatus to move towards the aerial vehicle according to the overlapping region.

Optionally, the receiver 1201 includes an optical signal receiver 1201, and for controlling the charging apparatus to move towards the aerial vehicle according to the overlapping region, the controller 1203 is configured to control the charging apparatus to enter the overlapping region, in response to detecting by using the optical signal receiver 1201 that the charging apparatus has reached an edge of the overlapping region, control the charging apparatus to move along a zigzag between edges of the overlapping region, and in response to detecting by using the optical signal receiver 1201 that the charging apparatus has reached a top corner of the overlapping region, control the charging apparatus to move from the top corner of the overlapping region towards the aerial vehicle.

Optionally, for detecting the movement route from the charging apparatus to the aerial vehicle according to the instruction signal, the detector 1202 is configured to detect a location and a direction of the aerial vehicle according to a received location of the optical signal, and determine the movement route from the charging apparatus to the aerial vehicle according to the location and the direction of the aerial vehicle.

Optionally, for receiving the optical signal sent by the aerial vehicle by using the optical signal transmitter after the aerial vehicle lands to the landing deck, the receiver 1201 is configured to receive, by using a detection apparatus disposed on the landing deck, the optical signal transmitted by the aerial vehicle by using the optical signal transmitter after the aerial vehicle lands to the landing deck.

Optionally, the landing deck includes a landing pad, and the detection apparatus is a movable detection apparatus, and is disposed on an edge of the landing pad.

Optionally, the receiver 1201 is configured to receive a communication signal sent by the aerial vehicle by using a communication module after the aerial vehicle lands to the landing deck.

Optionally, for detecting the movement route from the charging apparatus to the aerial vehicle according to the instruction signal, the detector 1202 is configured to detect a location and a direction of the aerial vehicle after the communication signal is received; and determine the movement route from the charging apparatus to the aerial vehicle according to the location and the direction of the aerial vehicle.

Optionally, for detecting the location and the direction of the aerial vehicle, the detector 1202 is configured to detect the location and the direction of the aerial vehicle according to an aerial vehicle positioning mark disposed on the aerial vehicle.

Optionally, the power supply end 1204 is configured to cause, by using magnetic attraction, the charging apparatus to complete the charger docking with the charging end disposed on the aerial vehicle when the charging apparatus is close to the aerial vehicle.

Optionally, a power supply end of the charging apparatus and the charging end 1204 of the aerial vehicle are provided with a magnetic contact pair, and the magnetic contact pair is used to generate the magnetic attraction when the charging apparatus is close to the aerial vehicle.

Optionally, the charging apparatus includes a charging vehicle.

Reference may be made to related description of related features in the embodiments corresponding to FIG. 1 to FIG. 10 for various features in the embodiment corresponding to FIG. 12. Details are not described herein again.

Figure 13:
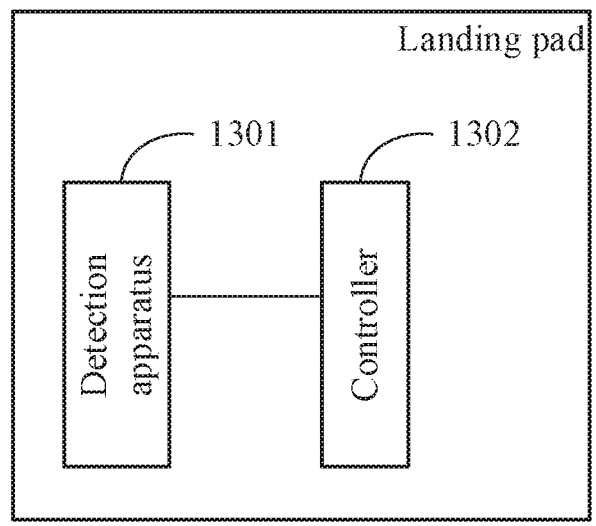
FIG. 13 is a schematic structural diagram of a landing pad according to an embodiment of this disclosure.

FIG. 13 is a schematic structural diagram of a landing pad according to an embodiment of this disclosure. The landing pad includes a detection apparatus 1301 and a controller 1302, where:

the detection apparatus 1301 is configured to receive an optical signal transmitted by an aerial vehicle located on the landing pad by using an optical signal transmitter; and the controller 1302 is configured to determine a received location of the optical signal, and send the received location to a charging apparatus located on the landing pad.

Optionally, the detection apparatus 1301 is a movable detection apparatus 1301, and is disposed on an edge of the landing pad.

Optionally, the landing pad is provided with a plurality of landing regions, and the landing regions are respectively used for landing different aerial vehicles.

Reference may be made to related description of related features in the embodiments corresponding to FIG. 1 to FIG. 10 for various features in the embodiment corresponding to FIG. 13. Details are not described herein again.

Figure 14:
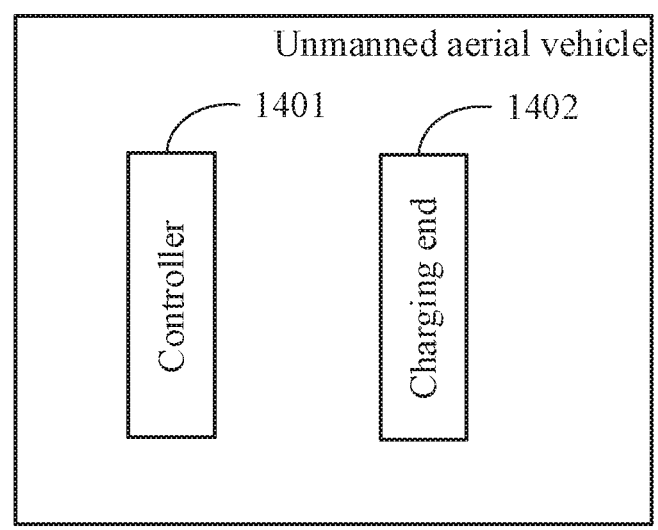
FIG. 14 is another schematic structural diagram of an aerial vehicle according to an embodiment of this disclosure.

FIG. 14 is another schematic structural diagram of an aerial vehicle according to an embodiment of this disclosure. The aerial vehicle includes: a controller 1401 and a charging end 1402, where:

the controller 1401 is configured to obtain a relative location to a landing deck, control, according to the relative location, the aerial vehicle to land to the landing deck, detect a movement route from the aerial vehicle to a charging apparatus located on the landing deck, and control, according to the movement route, the aerial vehicle to move towards the charging apparatus, and the charging end 1402 is configured to complete charger docking with the charging apparatus.

Optionally, for detecting the movement route from the aerial vehicle to the charging apparatus located on the landing deck, the controller 1401 is configured to detect a location and a direction of the charging apparatus, and determine the movement route from the aerial vehicle to the charging apparatus according to the location and the direction of the charging apparatus.

Optionally, for detecting the movement route from the aerial vehicle to the charging apparatus located on the landing deck, the controller 1401 is configured to detect a location coordinate and a direction of the aerial vehicle, obtain a location coordinate and a direction of the charging apparatus, and determine the movement route from the aerial vehicle to the charging apparatus according to the location coordinate and the direction of the aerial vehicle and the location coordinate and the direction of the charging apparatus.

Optionally, the aerial vehicle is further provided with an optical signal transmitter; the optical signal transmitter is configured to transmit an optical signal; and for detecting the location coordinate and the direction of the aerial vehicle, the controller 1401 is configured to detect the location coordinate and the direction of the aerial vehicle according to a received location of the optical signal.

Optionally, for completing the charger docking with the charging apparatus, the charging end 1402 is configured to complete, by using magnetic attraction, the charger docking with the charging apparatus when the aerial vehicle is close to the charging apparatus.

Reference may be made to related description of related features in the embodiments corresponding to FIG. 1 to FIG. 10 for various features in the embodiment corresponding to FIG. 14. Details are not described herein again.

Figure 15:
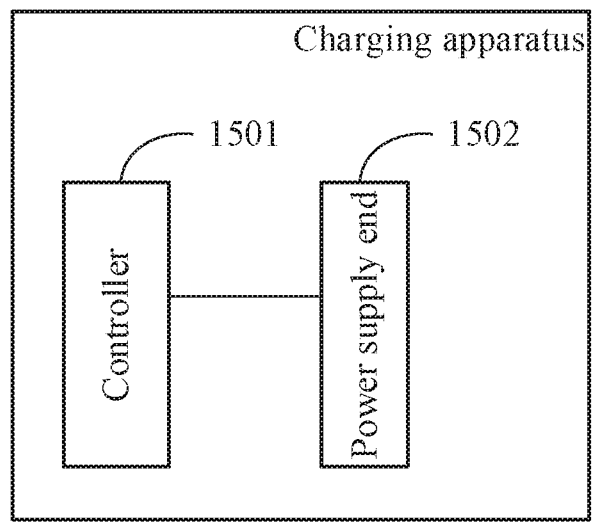
FIG. 15 is another schematic structural diagram of a charging apparatus according to an embodiment of this disclosure.

FIG. 15 is another schematic structural diagram of a charging apparatus according to an embodiment of this disclosure. The charging apparatus is located on a landing deck, and includes: a controller 1501 and a power supply end 1502, where:

the controller 1501 is configured to wait for the aerial vehicle to move towards the charging apparatus according to a movement route to the charging apparatus after the aerial vehicle lands to the landing deck; and the power supply end 1502 is configured to complete charger docking with a charging end disposed on the aerial vehicle.

Optionally, for completing the charger docking with the charging end disposed on the aerial vehicle, the power supply end 1502 is configured to complete the charger docking with the charging end disposed on the aerial vehicle when the aerial vehicle is close to the charging apparatus.

Reference may be made to related description of related features in the embodiments corresponding to FIG. 1 to FIG. 10 for various features in the embodiment corresponding to FIG. 15. Details are not described herein again.

Figure 16:
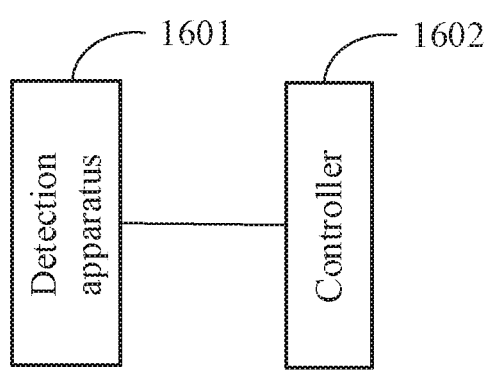
FIG. 16 is a schematic structural diagram of a landing pad according to an embodiment of this disclosure.

FIG. 16 is a schematic structural diagram of a landing pad according to an embodiment of this disclosure. The landing pad includes a detection apparatus 1601 and a controller 1602, where:

the detection apparatus 1601 is configured to receive an optical signal transmitted by an aerial vehicle located on the landing pad by using an optical signal transmitter; and the controller 1602 is configured to determine a received location of the optical signal, and send the received location to the aerial vehicle.

Optionally, the detection apparatus 1601 is a movable detection apparatus 1601, and is disposed on an edge of the landing pad.

Optionally, the landing pad is provided with a plurality of landing regions, and the landing regions are respectively used for landing different aerial vehicles.

Reference may be made to related description of related features in the embodiments corresponding to FIG. 1 to FIG. 10 for various features in the embodiment corresponding to FIG. 16. Details are not described herein again.

It can be clearly learned by persons skilled in the art that, for the purpose of convenient and brief description, for a specific working process of the foregoing system, apparatus, and unit, reference may be made to a corresponding process in the foregoing method embodiments, and details are not described herein again.

In the embodiments provided in this disclosure, the disclosed system, apparatus, and method may be implemented in other manners. For example, the described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through certain ends. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. Some of or all of the units may be selected according to actual needs to achieve the objectives of the solutions of the embodiments.

In addition, functional units in the embodiments of this disclosure may be integrated into one processing unit, or each of the units may exist alone physically, or two or more units may be integrated into one unit. The integrated unit may be implemented in the form of hardware, or may be implemented in the form of a software functional unit.

If the integrated unit is implemented in a form of a software functional module and sold or used as an independent product, the integrated unit may be stored in a computer-readable storage medium. Based on such an understanding, the technical solutions of this disclosure, or the part contributing to the prior art, or some or all of the technical solutions may be implemented in a form of a software product. The computer software product is stored in a storage medium and includes several instructions for instructing a computer device (which may be a personal computer, a logistics management server, a network device, or the like) to perform all or some of the steps of the methods described in the embodiments of this disclosure. The foregoing storage medium includes: any medium that can store a program code, such as a USB flash drive, a removable hard disk, a read-only memory (ROM), a random access memory (RAM), a magnetic disk, or an optical disc.

The foregoing embodiments are merely intended for describing the technical solutions of this disclosure, but not for limiting this disclosure. Although this disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this disclosure.

What is claimed is:

1. A method for charging an aerial vehicle, implementable by an aerial vehicle, the method comprising:
obtaining a relative location of the aerial vehicle to a landing deck, and landing on the landing deck according to the relative location; and
sending an optical instruction signal from at least one optical signal transmitter to a charging apparatus located on the landing deck after the aerial vehicle lands on the landing deck, to cause the charging apparatus to detect a movement route from the charging apparatus to the aerial vehicle, to move towards the aerial vehicle according to the movement route, and to dock to a charging end of the aerial vehicle.

2. The method according to claim 1, wherein the at least one optical signal transmitter comprises two optical signal transmitters, and the sending an optical instruction signal from the at least one optical signal transmitter comprises:
transmitting two beams of optical signals of different wavelengths respectively by using the two optical signal transmitters to cause the charging apparatus to detect an overlapping region of the two beams of optical signals according to received locations of the two beams of optical signals, and determine the movement route based on the overlapping region.

3. The method according to claim 1, wherein:
the optical instruction signal causes the charging apparatus to detect a location and a direction of the aerial vehicle according to a received location of the optical instruction signal, and determine the movement route based on the location and the direction of the aerial vehicle.

4. The method according to claim 1, wherein:
the aerial vehicle comprises an aerial vehicle positioning mark; and
the optical instruction signal comprises a communication signal that causes the charging apparatus to detect a location and a direction of the aerial vehicle according to the aerial vehicle positioning mark and determine the movement route based on the location and the direction of the aerial vehicle.

5. The method according to claim 1, wherein docking to a charging end of the aerial vehicle comprises:
causing the charging apparatus to dock under magnetic attraction to the charging end of the aerial vehicle.

6. The method according to claim 5, wherein the charging end of the aerial vehicle and a power supply end of the charging apparatus are respectively provided with a magnetic contact pair for generating the magnetic attraction.

7. A method for charging an aerial vehicle, implementable by a charging apparatus, the method comprising:
receiving an optical instruction signal sent by the aerial vehicle from at least one optical signal transmitter after the aerial vehicle lands to a landing deck;
detecting a movement route from the charging apparatus to the aerial vehicle according to the optical instruction signal;
moving towards the aerial vehicle according to the movement route; and
docking to a charging end of the aerial vehicle.

8. The method according to claim 7, wherein:
the detecting a movement route from the charging apparatus to the aerial vehicle according to the optical instruction signal comprises: detecting a coverage region of the optical instruction signal according to a received location of the optical instruction signal; and
the moving towards the aerial vehicle according to the movement route comprises: moving towards the aerial vehicle according to the coverage region.

9. The method according to claim 8, wherein the moving towards the aerial vehicle according to the coverage region comprises:
detecting a location and a direction of the aerial vehicle after entering the coverage region; and
moving towards the aerial vehicle according to the location and the direction of the aerial vehicle.

10. The method according to claim 8, wherein:
the at least one optical signal transmitter comprises two optical signal transmitters;
the receiving an optical instruction signal sent by the aerial vehicle from at least one optical signal transmitter after the aerial vehicle lands on the landing deck comprises: receiving two beams of optical signals of different wavelengths respectively transmitted by the two optical signal transmitters after the aerial vehicle lands on the landing deck;
the detecting a coverage region of the optical instruction signal according to a received location of the optical instruction signal comprises: detecting an overlapping region of the two beams of optical signals according to received locations of the two beams of optical signals; and
the moving towards the aerial vehicle according to the coverage region comprises: moving towards the aerial vehicle according to the overlapping region.

11. The method according to claim 10, wherein:
the charging apparatus comprises an optical signal receiver; and
the moving towards the aerial vehicle according to the overlapping region comprises:
entering the overlapping region;
in response to detecting, by using the optical signal receiver, that the charging apparatus has reached an edge of the overlapping region, moving along a zigzag between edges of the overlapping region; and
in response to detecting, by using the optical signal receiver, that the charging apparatus has reached a top corner of the overlapping region, moving from the top corner of the overlapping region towards the aerial vehicle.

12. The method according to claim 7, wherein the detecting a movement route from the charging apparatus to the aerial vehicle according to the instruction signal comprises:
detecting a location and a direction of the aerial vehicle according to a received location of the optical signal; and
determining the movement route from the charging apparatus to the aerial vehicle according to the location and the direction of the aerial vehicle.

13. The method according to claim 7, wherein the optical instruction signal comprises a communication signal, and the receiving an optical instruction signal sent by the aerial vehicle after the aerial vehicle lands on the landing deck comprises:
receiving the communication signal sent by the aerial vehicle after the aerial vehicle lands on the landing deck;
detecting a location and a direction of the aerial vehicle after the communication signal is received; and
determining the movement route from the charging apparatus to the aerial vehicle according to the location and the direction of the aerial vehicle.

14. The method according to claim 13, wherein the detecting a location and a direction of the aerial vehicle comprises:
   detecting the location and the direction of the aerial vehicle according to an aerial vehicle positioning mark on the aerial vehicle.

15. The method according to claim 7, wherein the docking to a charging end of the aerial vehicle comprises:
   causing the charging apparatus to dock under magnetic attraction to the charging end on the aerial vehicle.

16. The method according to claim 7, wherein the charging apparatus comprises a charging vehicle.

17. A method for charging an aerial vehicle, implementable by a charging apparatus, the method comprising:
   receiving an instruction signal sent by the aerial vehicle after the aerial vehicle lands to a landing deck, the instruction signal comprising a communication signal sent by the aerial vehicle after the aerial vehicle lands on the landing deck;
   detecting a location and a direction of the aerial vehicle after the communication signal is received;
   detecting a movement route from the charging apparatus to the aerial vehicle according to the location and the direction of the aerial vehicle;
   moving towards the aerial vehicle according to the movement route; and
   docking to a charging end of the aerial vehicle.

18. The method according to claim 17, wherein the receiving an instruction signal sent by the aerial vehicle after the aerial vehicle lands to a landing deck comprises:
   receiving an optical signal sent by the aerial vehicle from at least one optical signal transmitter after the aerial vehicle lands on the landing deck.

19. The method according to claim 17, wherein the detecting a location and a direction of the aerial vehicle comprises:
   detecting a coverage region of the optical signal according to a received location of the optical signal;
   moving towards the aerial vehicle according to the coverage region; and
   detecting the location and the direction of the aerial vehicle after entering the coverage region.

20. The method according to claim 17, wherein:
   the detecting a location and a direction of the aerial vehicle comprises detecting the location and the direction of the aerial vehicle according to a received location of the communication signal.

* * * * *